US012623470B2

(12) United States Patent
Hakamata et al.

(10) Patent No.: US 12,623,470 B2
(45) Date of Patent: May 12, 2026

(54) PRINTING APPARATUS, CONTROL METHOD FOR PRINTING APPARATUS, AND CONVEYANCE APPARATUS

(71) Applicant: CANON KABUSHIKI KAISHA, Tokyo (JP)

(72) Inventors: Keisei Hakamata, Kanagawa (JP); Yuki Shindo, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 238 days.

(21) Appl. No.: 18/493,095

(22) Filed: Oct. 24, 2023

(65) Prior Publication Data

US 2024/0131854 A1 Apr. 25, 2024
US 2024/0227417 A9 Jul. 11, 2024

(30) Foreign Application Priority Data

Oct. 25, 2022 (JP) ................................ 2022-170872

(51) Int. Cl.
*B41J 11/00* (2006.01)
*B41J 11/58* (2006.01)
*B41J 29/393* (2006.01)

(52) U.S. Cl.
CPC .............. *B41J 11/007* (2013.01); *B41J 11/58* (2013.01); *B41J 29/393* (2013.01)

(58) Field of Classification Search
CPC .......... B41J 11/007; B41J 11/58; B41J 29/393
See application file for complete search history.

(56) References Cited

U.S. PATENT DOCUMENTS

| | | | | |
|---|---|---|---|---|
| 7,984,958 | B2 | 7/2011 | Koga et al. | |
| 8,413,983 | B2 * | 4/2013 | Hirano | B65H 3/0684 271/265.01 |
| 10,513,407 | B2 * | 12/2019 | Nishida | B65H 5/36 |
| 2021/0044712 | A1 * | 2/2021 | Ueyama | H04N 1/00649 |
| 2024/0075757 | A1 * | 3/2024 | Shindo | G06K 15/16 |

FOREIGN PATENT DOCUMENTS

| | | | | |
|---|---|---|---|---|
| JP | 2005247488 | A | * | 9/2005 |
| JP | 2006-273559 | A | | 10/2006 |
| JP | 2007-90800 | A | | 4/2007 |

OTHER PUBLICATIONS

Office Action dated Dec. 20, 2024, in Japanese Patent Application No. 2022-170872.

* cited by examiner

*Primary Examiner* — Sharon Polk
(74) *Attorney, Agent, or Firm* — Venable LLP

(57) ABSTRACT

A printing apparatus includes a printing unit configured to perform printing on a sheet, a conveying unit configured to convey a sheet to a print position of the printing unit, a motor configured to drive the conveying unit, and a control unit configured to control rotation of the motor. The control unit is capable of executing holding control of holding the motor at a stop position. The control unit is configured to determine a second output value, which is an output value of the motor in the holding control, in accordance with a first output value, which is an output value of the motor before stopping at the stop position.

19 Claims, 26 Drawing Sheets

FIG. 28

| TABLE | LEADING END POSITION OF PRINT MEDIUM S2 | ACCELERATION(m/s2) | ROTATIONAL SPEED(rpm) |
|---|---|---|---|
| 1 | PREDETERMINED REGION A1 OUTSIDE | a1 | n |
| 2 | PREDETERMINED REGION A1 INSIDE | a2(<a1) | n |

PRINTING APPARATUS, CONTROL METHOD FOR PRINTING APPARATUS, AND CONVEYANCE APPARATUS

BACKGROUND OF THE INVENTION

Field of the Invention

The present invention relates to a printing apparatus, a control method for the printing apparatus, and a conveyance apparatus.

Description of the Related Art

In an inkjet printer as an example of a printing apparatus, printing is performed by repeating conveyance of a sheet by a predetermined distance and discharge of ink onto the sheet by a print head. In such a printing apparatus, when stopping the sheet being conveyed, an external force in a direction opposite to the conveying direction may be applied to a conveyance member such as a conveyance roller due to the torsion or resistance of a member of a conveyance mechanism. This force may return the temporarily stopped sheet in the direction opposite to the conveying direction. In order to reduce such a phenomenon, Japanese Patent Laid-Open No. 2006-273559 discloses that the value of current flowing to the motor is controlled so that the motor, which drives the conveyance mechanism, stops at a target stop position.

The output of the motor required to hold the motor at the stop position can vary in accordance with the magnitude of the external force described above. Therefore, depending on the magnitude of the external force, the output of the motor may be insufficient, and the motor may not be held at the stop position and rotate in the reverse direction. Further, depending on the magnitude of the external force, the output of the motor may be excessive, and the motor may rotate further forward from the stop position.

SUMMARY OF THE INVENTION

The present invention provides a technique of more appropriately controlling the output of a motor in holding control of holding the motor at a stop position than a conventional technique.

According to an aspect of the present invention, there is provided a printing apparatus comprising a printing unit configured to perform printing on a sheet; a conveying unit configured to convey a sheet to a print position of the printing unit; a motor configured to drive the conveying unit; and a control unit configured to control rotation of the motor, wherein the control unit is capable of executing holding control of holding the motor at a stop position, and the control unit is configured to determine a second output value, which is an output value of the motor in the holding control, in accordance with a first output value, which is an output value of the motor before stopping at the stop position.

Further features of the present invention will become apparent from the following description of exemplary embodiments (with reference to the attached drawings).

BRIEF DESCRIPTION OF THE DRAWINGS

FIG. 28 is a view showing an example of a feed drive table for a drive motor.

DESCRIPTION OF THE EMBODIMENTS

Figure 1:
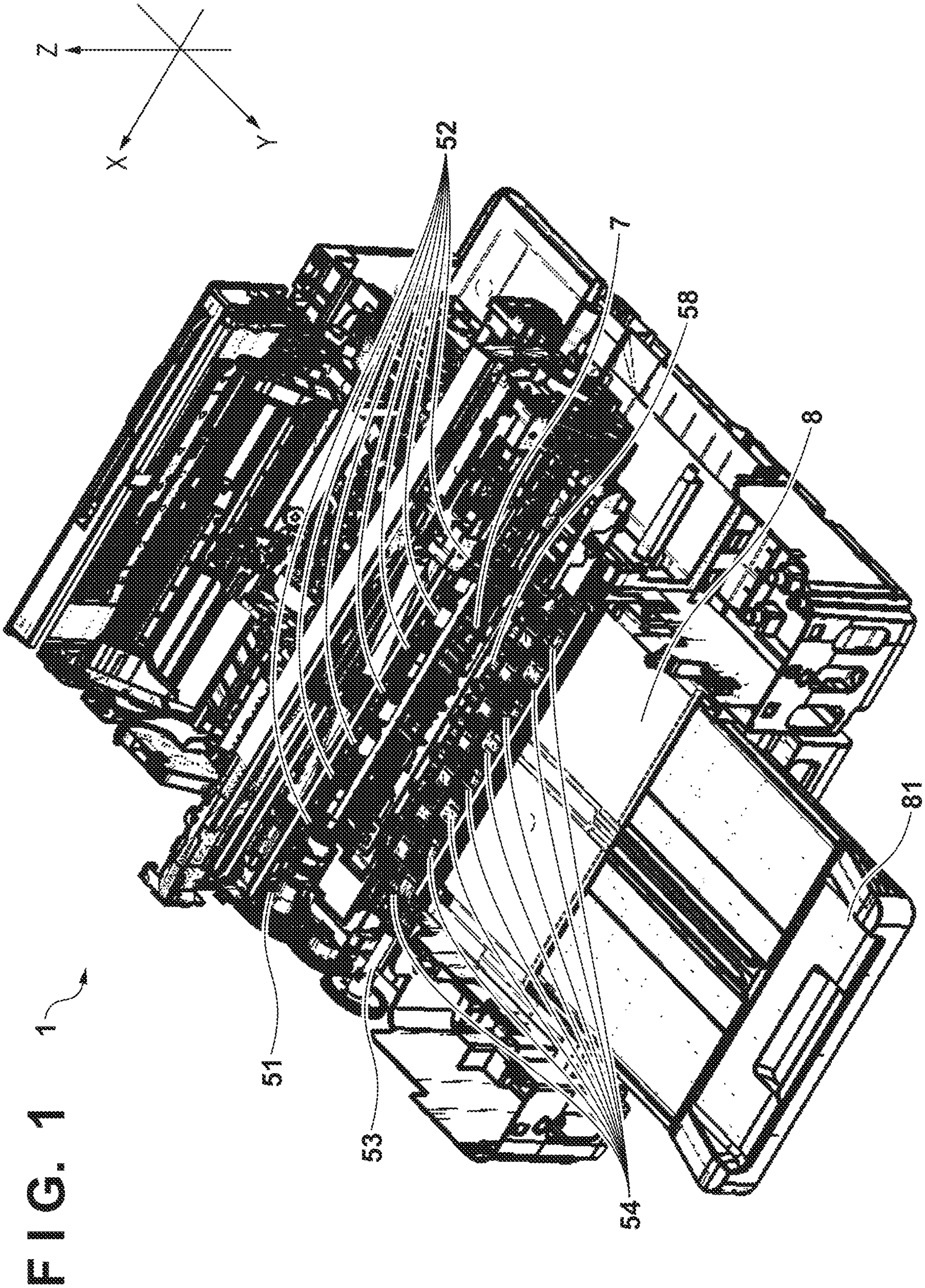
FIG. 1 is a perspective view showing the internal structure of a printing apparatus according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

1. First Embodiment

<1.1. Arrangement of Printing Apparatus>

<1.1.1. Outline>

Figure 2:
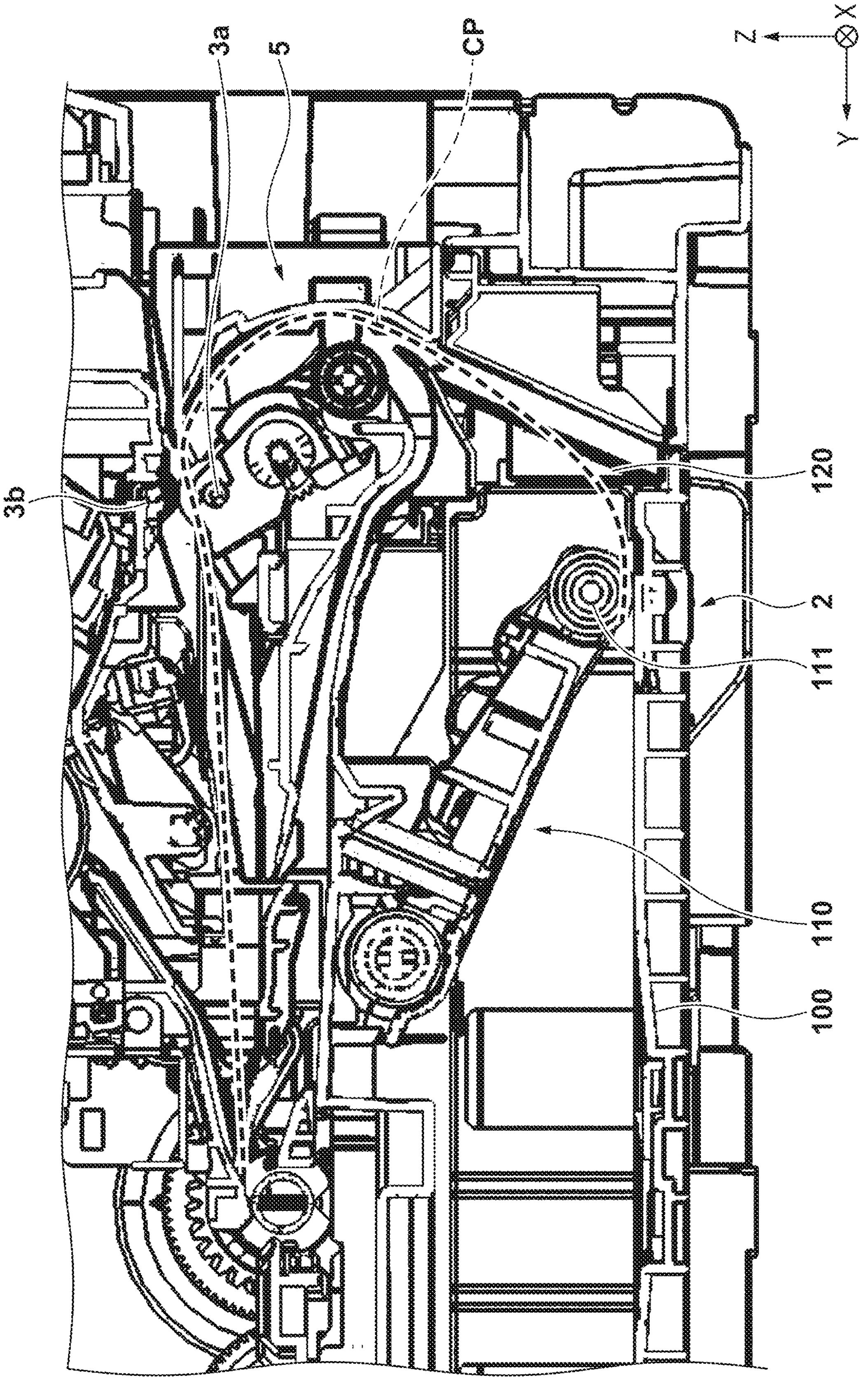
FIG. 2 is a sectional view of the feeding unit and the conveying unit of the printing apparatus in FIG. 1.

FIG. 1 is a perspective view showing the internal structure of a printing apparatus 1 according to an embodiment. FIG. 2 is a sectional view of a feeding unit 2 and a conveying unit 5 of the printing apparatus 1 in FIG. 1.

The printing apparatus 1 performs printing on a sheet. In this embodiment, the printing apparatus 1 is a serial inkjet printing apparatus that performs printing by discharging ink onto a sheet. The printing apparatus 1 includes the feeding unit 2, the conveying unit 5, a conveyance motor 6 (see FIG. 6), a printing unit 7, and a discharge unit 8.

The feeding unit 2 and the conveying unit 5 convey a sheet (print medium). The feeding unit 2 includes a pickup roller 111. The conveying unit 5 includes a conveyance roller 51, a discharge roller 53, and an intermediate roller pair 3 (see FIG. 7). The feeding unit 2 and the conveying unit 5 will be described in detail later.

The printing unit 7 performs printing on a conveyed sheet. For example, the printing unit 7 includes a print head 71 (see FIG. 8) that can discharge ink and a carriage 72 (see FIG. 8) on which the print head 71 is mounted and which can reciprocate in the scanning direction (the widthwise direction of a sheet which intersects the conveying direction). For example, causing the carriage 72 to move the print head 71 in the scanning direction can perform printing at an arbitrary position on a sheet in the widthwise direction.

The sheet on which printing has been performed by the printing unit 7 is discharged from the discharge unit 8. The discharge unit 8 includes a discharge tray 81. The sheet on which printing has been performed by the printing unit 7 is discharged onto the discharge tray 81 by the discharge roller 53 of the conveying unit 5 (to be described later).

Figure 6:
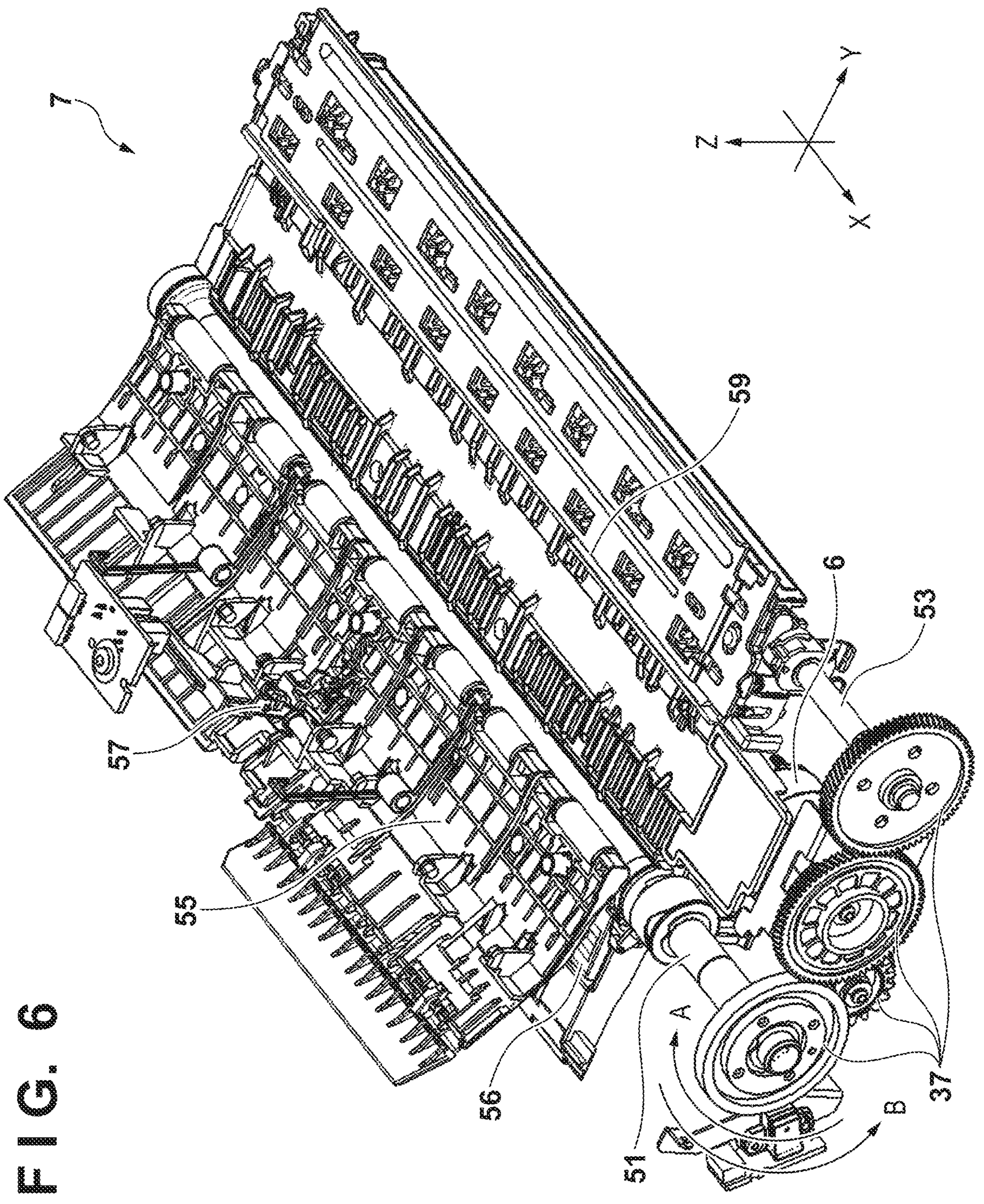
FIG. 6 is a perspective view of the conveying unit.

The conveyance motor 6 transmits its drive force to the conveyance roller 51, the discharge roller 53, an intermediate roller 3*a*, and the roller of the feeding unit 2 through a gear train 37 (see FIG. 6). That is, the conveyance motor 6 drives each of a plurality of rollers that convey a sheet. For example, the conveyance roller 51 and the pickup roller 111 are driven by the same conveyance motor 6.

In this embodiment, a conveyance path CP for sheets is formed in the printing apparatus 1. The conveyance path CP is a path extending from the feeding unit 2 to the discharge unit 8 through the conveying unit 5. The details will be described later. Note that in the following description, the feeding unit 2 side and the discharge unit 8 side of the conveyance path CP will be respectively referred to as a conveying-direction upstream side and a conveying-direction downstream side. In addition, the driving direction of the conveyance motor 6 when rotating to make the conveyance roller 51 convey a sheet to the conveying-direction downstream side will be sometimes referred to as a forward direction, and the driving direction of the conveyance motor 6 when rotating to make the conveyance roller 51 convey a sheet to the conveying-direction upstream side will be sometimes referred to as a reverse direction.

<1.1.2 Arrangement of Feeding Unit>

Figure 3:
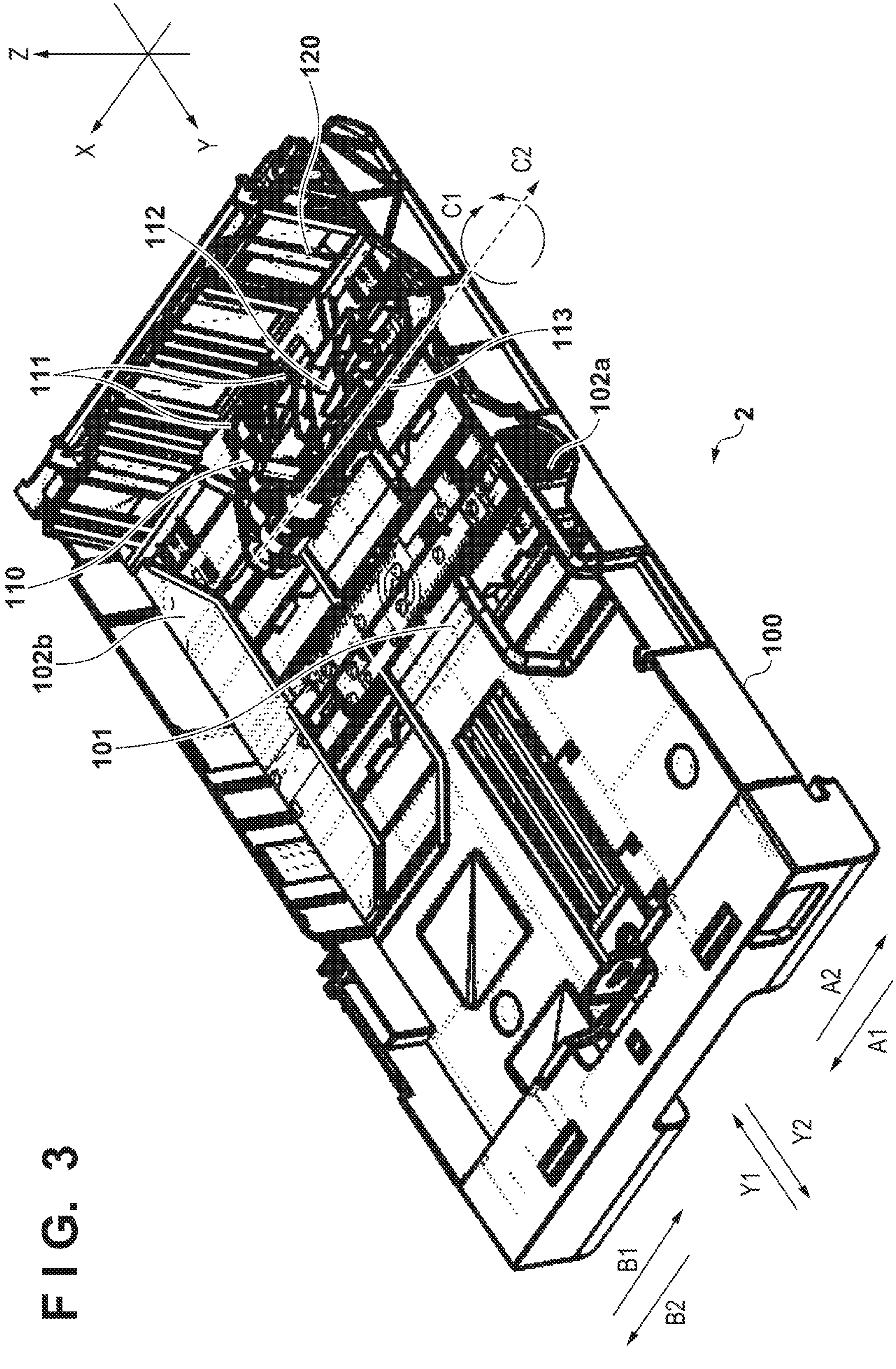
FIG. 3 is a perspective view of the feeding unit.

FIG. 3 will also be referred to below. FIG. 3 is a perspective view of the feeding unit 2. The feeding unit 2 feeds (conveys) a sheet to the conveying unit 5. The feeding unit 2 includes a cassette 100, a pickup roller unit 110, and a separation unit 120.

The cassette 100 can store a plurality of stacked sheets. In this embodiment, the cassette 100 is provided in a lower portion of the housing of the printing apparatus 1. Furthermore, the cassette 100 is provided below the printing unit 7. The cassette 100 includes a stacking portion 101 on which sheets are stacked and left and right side guides 102*a* and 102*b* that guide side portions of a sheet in the widthwise direction. The side guides 102*a* and 102*b* align the left and right side faces of sheets. The positions of the side guides 102*a* and 102*b* can be adjusted in accordance with the width of a sheet. The side guides 102*a* and 102*b* are configured to move in tandem with each other in the arrow A1 and B1 directions approaching each other and move in tandem with each other in the arrow A2 and B2 directions separating from each other while facing both side portions of the sheet. This arrangement aligns the sheet so as to make its center in the widthwise direction (the X direction in FIG. 3) be always located at a constant position. In addition, the stacking portion 101 can move in the arrow Y1 and Y2 directions and is moved by operation by the user. For example, sheets are stacked (set) on the stacking portion 101 while it is pulled out most in the Y2 direction.

The pickup roller unit 110 is a unit for feeding (conveying) a sheet. A sheet stacked on the cassette 100 is fed to the conveying unit 5 by the pickup roller 111 included in the pickup roller unit 110. The pickup roller unit 110 is placed above the stacking portion 101. The pickup roller unit 110 includes the pickup roller 111, a pickup arm 112, and a drive shaft 113.

The pickup roller 111 is provided upstream of the conveyance roller 51 in the conveying direction in the conveyance path CP and conveys a sheet along the conveyance path CP. In addition, the pickup roller 111 conveys a sheet stacked on the stacking portion 101 to the conveyance path CP.

The pickup arm 112 can rotate about the drive shaft 113 in the arrow C1 and C2 directions in accordance with the stacking height of sheets stacked on the stacking portion 101. The distal end of the pickup arm 112 is provided with the pickup roller 111 that feeds the uppermost sheet. A drive force is transmitted from the conveyance motor 6 to the pickup roller 111 through the drive shaft 113 and an idler gear (not shown). In addition, the pickup roller unit 110 is provided with a biasing member (not shown) that biases the pickup arm 112 in the arrow C1 direction. This biasing member presses the pickup roller 111 against a sheet with a predetermined biasing force in the standby state of the pickup roller unit 110. The pickup roller 111 is positioned to come into contact with the sheet in the center of the sheet in the widthwise direction.

Figure 4B:
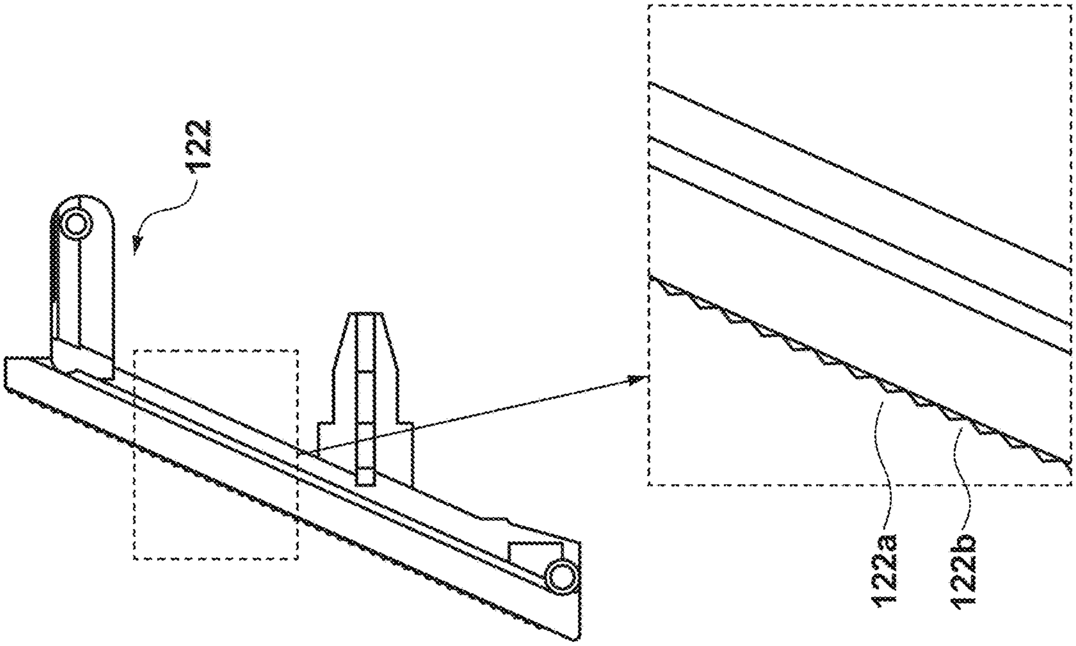
FIGS. 4A and 4B are views for explaining the structure of a separation unit.
Figure 4A:
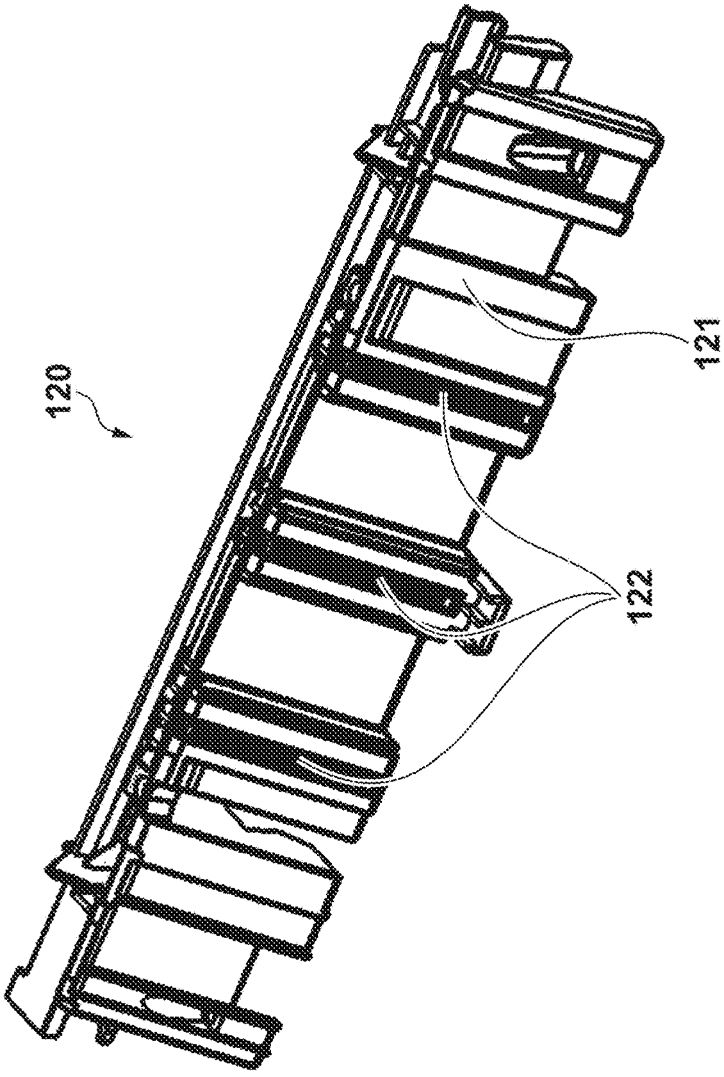
Figure 5C:
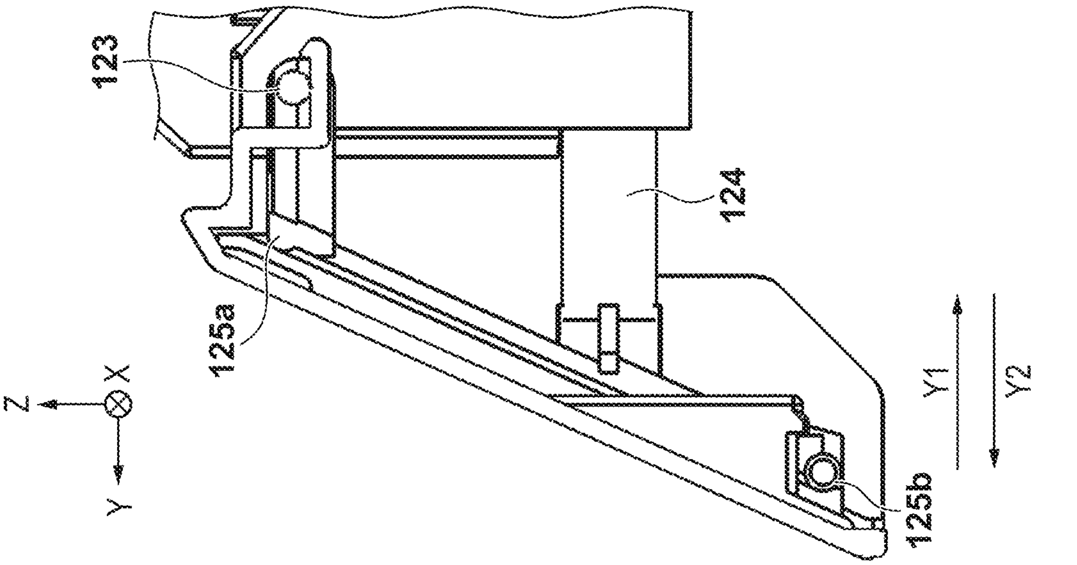
FIGS. 5A to 5C are views for explaining the structure of the separation unit.
Figure 5B:
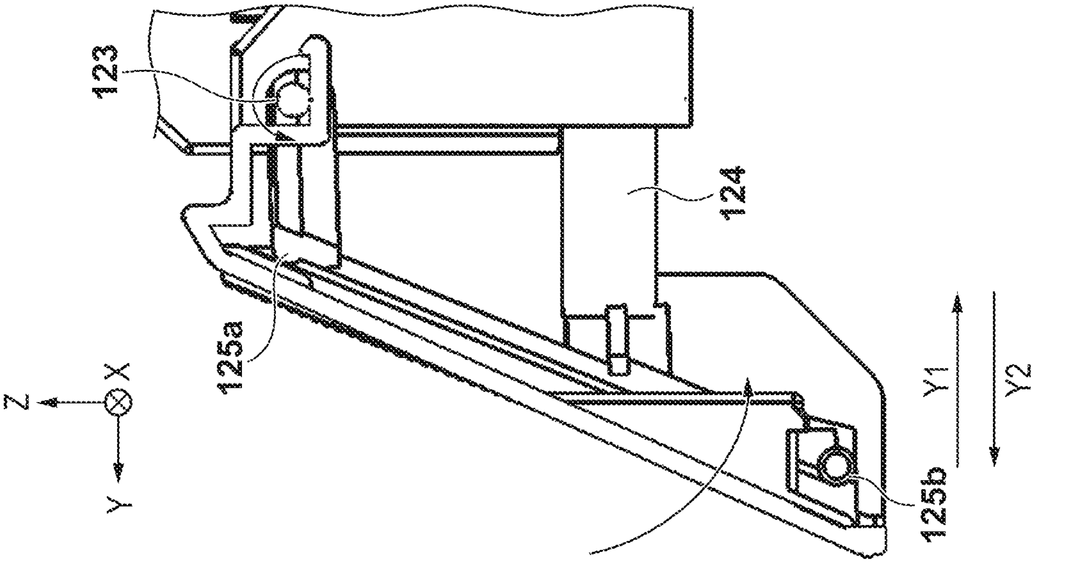
Figure 5A:
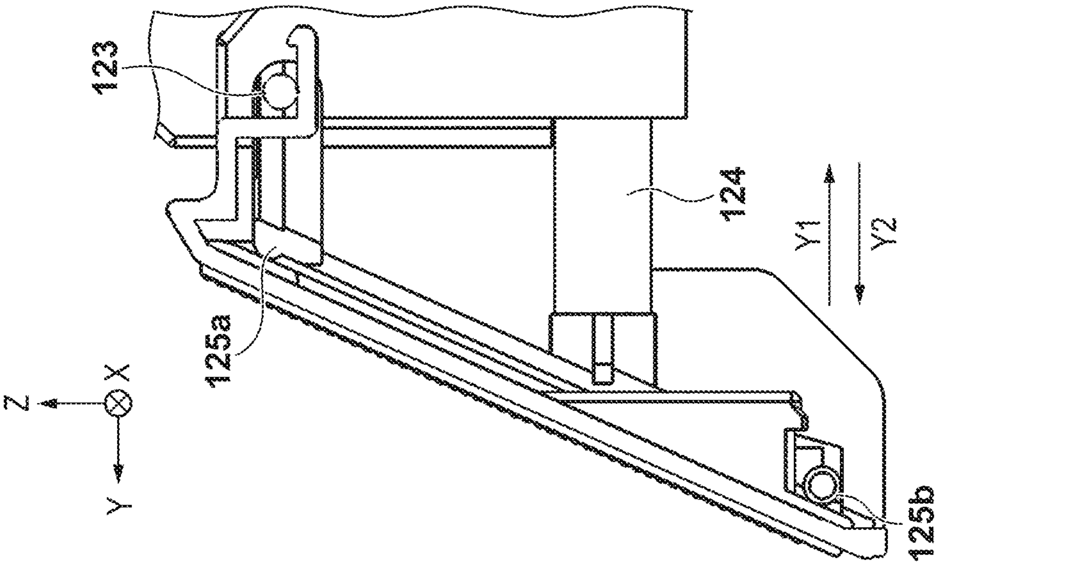

The separation unit 120 separates the uppermost sheet of the sheets stacked on the stacking portion 101 from the remaining sheets. FIGS. 4A to 5C are views for explaining the structure of the separation unit 120. The separation unit 120 is placed on the downstream side (the arrow Y1 side) in the feeding direction of sheets in the stacking portion 101. The separation unit 120 is provided with an inclined surface member 121 and a separation piece 122. An inclined surface with an obtuse angle formed with respect to the feeding direction (arrow Y1 direction) of sheets is formed on the inclined surface member 121 to give a predetermined separation resistance force to a sheet. A plurality of arc protrusions 122*a* are consecutively formed on the upper surface of the separation piece 122 at a predetermined pitch in the vertical direction (FIG. 4B). Valley portions 122*b* are formed between the arc protrusions 122*a*. The separation piece 122 can move in the arrow Y1 and Y2 directions along a guide portion 123 provided on the inclined surface member 121 (FIGS. 5A and 5B). As shown in FIG. 5A, in the standby state, the separation piece 122 abuts against Y-direction abutment surfaces 125*a* and 125*b* of the inclined surface member 121 with the biasing force of a biasing member 124 in the arrow Y2 direction and protrudes from the inclined surface member 121 in the arrow Y2 direction. In addition, when a sheet is fed, the separation piece 122 is pushed by the sheet on the stacking portion 101 to move in the arrow Y1 direction. On the other hand, depending on the frictional resistance between the guide portion 123 and the separation piece 122 and the position where the separation piece 122 is pressed by the biasing member 124 and the sheet, the separation piece 122 makes rotational motion about the guide portion 123 as shown in FIG. 5B, if the position where the separation piece 122 is pressed by the sheet is low. If the position where the separation piece 122 is pressed by the sheet is high, the separation piece 122 translates in the Y1 direction as shown in FIG. 5C.

<1.1.3. Arrangement of Conveying Unit>

Figure 7:
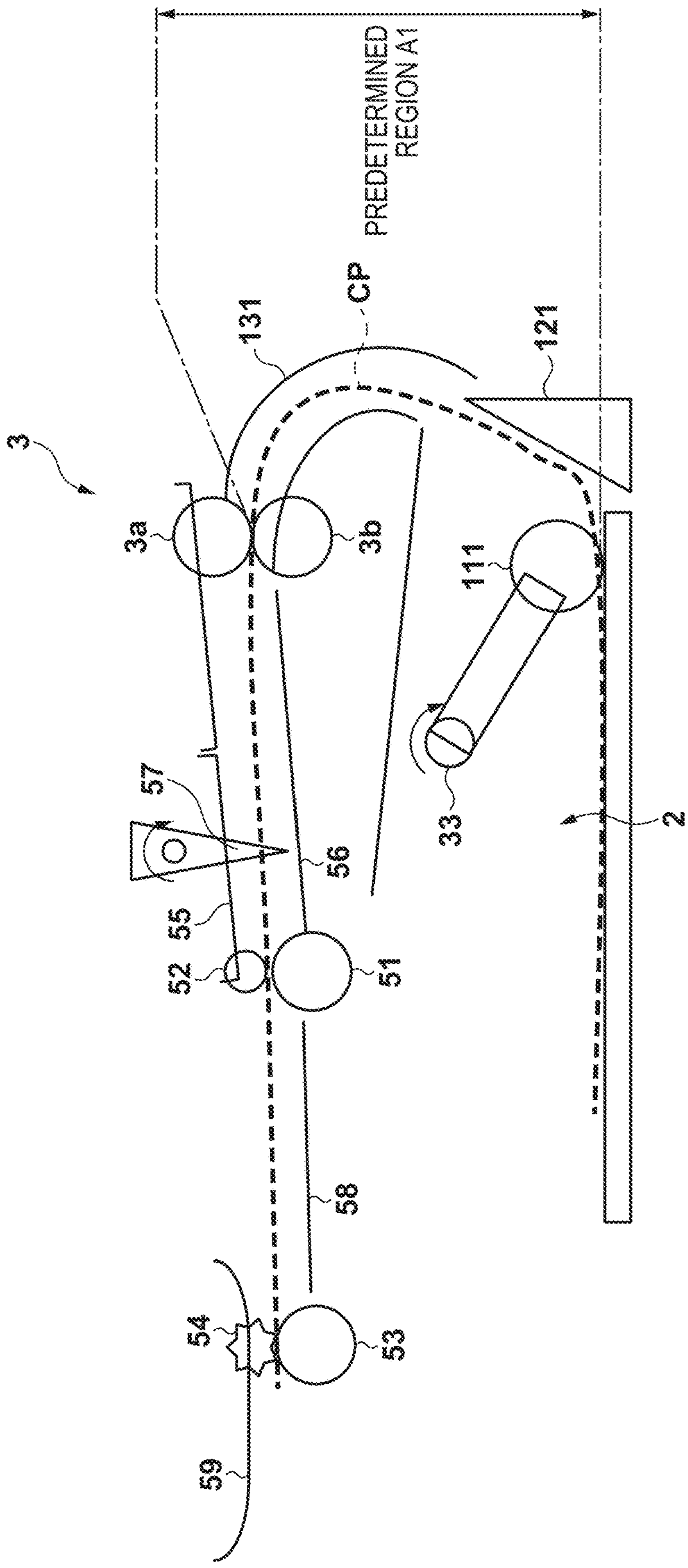
FIG. 7 is a schematic view of the conveying unit and a conveyance path.

FIGS. 6 and 7 will be referred to in addition to FIGS. 1 and 2. FIG. 6 is a perspective view of the conveying unit 5. FIG. 7 is a schematic view of the conveying unit 5 and the conveyance path CP.

The conveying unit 5 includes the conveyance roller 51, a pinch roller 52, the discharge roller 53, a spur 54, and the intermediate roller pair 3.

The conveyance roller 51 conveys a sheet along the conveyance path CP. In addition, the conveyance roller 51 conveys the sheet to the print position of the printing unit 7. The pinch roller 52 is provided to face the conveyance roller 51. The discharge roller 53 and the spur 54, which face each other, discharge the sheet to the discharge tray 81. The intermediate roller pair 3 is constituted by intermediate rollers 3*a* and 3*b* facing each other. The intermediate roller 3*a* is provided between the conveyance roller 51 and the pickup roller 111 in the conveyance path CP.

As described above, in this embodiment, the conveyance motor 6 drives the respective types of rollers constituting the feeding unit 2 and the conveying unit 5. That is, a sheet is conveyed in the printing apparatus 1 by using one drive source. Furthermore, the pickup roller 111, the intermediate roller 3*a*, the conveyance roller 51, and the discharge roller 53 are all rotated by a drive train coupled with the conveyance motor 6 as a drive source. This arrangement will be described more specifically below.

The conveyance roller 51 and the discharge roller 53 are coupled to the conveyance motor 6 with the gear train 37. When the conveyance motor 6 drives the conveyance roller 51 in the arrow A direction in FIG. 6, the conveyance roller 51 and the discharge roller 53 each rotate in a direction to convey a sheet to the downstream side in the conveying direction. When the conveyance motor 6 drives the conveyance roller 51 in the arrow B direction in FIG. 6, the conveyance roller 51 and the discharge roller 53 each rotate in a direction to convey the sheet to the upstream side in the conveying direction.

The conveyance roller 51 is coupled to an input gear 33 of the feeding unit 2 through a gear train (not shown). When the conveyance roller 51 rotates in the arrow A direction, the input gear 33 of the feeding unit 2 described above rotates in the A direction in FIG. 6, that is, a direction to perform a feeding operation. When the conveyance roller 51 rotates in the arrow B direction, the input gear 33 of the feeding unit 2 described above rotates in the arrow B direction in FIG. 6, that is, a direction to perform a feed preparation operation. A conveyance encoder 813 (see FIG. 8) detects the drive amount of the conveyance motor 6. The speed and the drive amount of the conveyance motor 6 are controlled by performing various types of control such as PID control.

The conveyance path CP for a sheet in the printing apparatus 1 will be described next. The sheet conveyed by the pickup roller 111 of the feeding unit 2 passes through the conveyance path CP indicated by the dotted line in FIG. 7, is guided by the inclined surface member 121 and a U-turn member 131, and is conveyed to the intermediate roller pair 3. The sheet further conveyed by the intermediate roller pair 3 is guided by a pinch roller holder 55 and a guide portion 56 and fed to the conveyance roller 51.

The sheet fed to the conveyance roller 51 is subjected to skew correction and the like and then conveyed to the print position of the printing unit 7. The printing unit 7 performs printing on the sheet conveyed to the print position. The sheet conveyed from the conveyance roller 51 is guided by a platen 58 and a spur base 59 and then reaches the discharge roller 53. During a printing operation, a conveying operation is performed by either or both of the conveyance roller 51 and the discharge roller 53. Upon completion of the printing operation, the sheet is discharged to the discharge tray 81 by the discharge roller 53. In addition, the platen 58 guides the sheet so as to keep the distance between the sheet conveyed to the printing unit 7 and the nozzle constant.

In this embodiment, the inclined surface member 121 and the U-turn member 131 form a curved section CP1 of the conveyance path CP. That is, the inclined surface member 121 and the U-turn member 131 are examples of path forming members that form the curved section CP1 of the conveyance path CP. In this embodiment, the section CP1 forms a reverse path for reversing the traveling direction of the sheet.

The pinch roller holder 55 is provided with an end portion detection lever 57. When a sheet passes through the conveyance path CP, the end portion detection lever 57 is made to pivot to detect the leading end and trailing end positions of the sheet. That is, the sheet is detected at the detection position on the conveyance path. If, for example, the end portion detection lever 57 detects the leading end position of a sheet at the time of a feeding operation and detects the trailing end position of the sheet at the time of a printing operation or discharging operation, it is possible to measure the actual length of the sheet based on the drive amount of the conveyance motor 6 which is required until the detection of the leading end position and the trailing end position. Although this case exemplifies the mechanical detection of end portions of the sheet with the end portion detection lever 57, the end portions of the sheet may be optically detected with a photosensor or the like.

Note that when a consecutive feeding operation (to be described later) is to be performed, after the trailing end of a preceding sheet passes through the pickup roller 111, a succeeding sheet is fed by the pickup roller 111 at a predetermined interval with a delay of the gear train, thereby consecutively performing a feeding operation.

<1.1.4. Control Arrangement>

Figure 8:
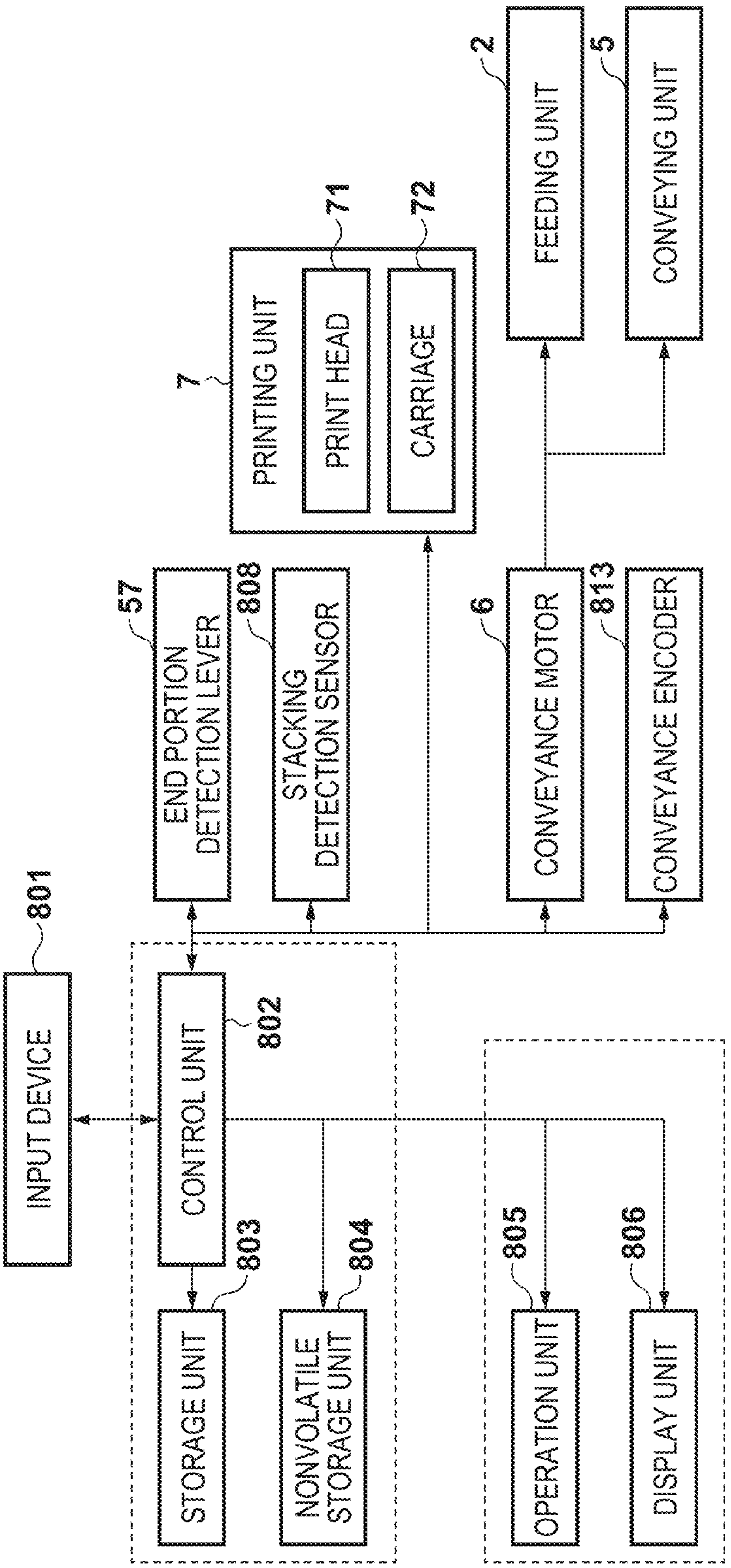
FIG. 8 is a block diagram showing the control arrangement of the printing apparatus.

FIG. 8 is a block diagram showing the control arrangement of the printing apparatus 1. A control unit 802 comprehensively controls the printing apparatus 1. The control unit 802 is, for example, a Central Processing Unit (CPU). A storage unit 803 includes a Read Only Memory (ROM) and a Random Access Memory (RAM). The ROM stores various programs. The RAM provides a system work memory for allowing the CPU to operate as the control unit

802 and is used to temporarily store various data. For example, the CPU as the control unit 802 loads programs stored in the ROM included in the storage unit 803 into the RAM included in the storage unit 803 and executes the programs, thereby implementing various functions of the printing apparatus 1. A nonvolatile storage unit 804 is, for example, a Hard Disk Drive (HDD) and stores various programs and data.

An operation unit 805 receives an operation input by the user. The operation unit 805 can include, for example, a touch panel and hard keys. For example, the control unit 802 controls the operation of the printing apparatus 1 in accordance with the contents of the operation of the operation unit 805 by the user, that is, instruction contents. Note that the control unit 802 can also receive instructions concerning the operation of the printing apparatus 1 from an input device 801 such as a PC or smartphone. A display unit 806 displays various types of information.

The control unit 802 obtains detection results from the end portion detection lever 57, a stacking detection sensor 808, and the conveyance encoder 813 and controls the conveyance motor 6 and the printing unit 7 based on the detection results and the like. In addition, as the control unit 802 controls the operation of the conveyance motor 6, various types of rollers and the like included in the feeding unit 2 and the conveying unit 5 are driven. In this case, the stacking detection sensor 808 detects the stacked state of sheets on the stacking portion 101. The conveyance encoder 813 detects the drive amount of the conveyance motor 6.

An outline of control of the conveyance motor 6 will be described below. In this embodiment, the conveyance motor 6 is a DC motor, and the control unit 802 controls the DC motor using a PWM value. For example, the control unit 802 controls the power (PWM value) to be supplied to the conveyance motor 6 in accordance with load variation so as to rotate the conveyance motor 6 at a target rotational speed. At this time, the control unit 802 adjusts the PWM value based on the difference between the actual rotational speed of the conveyance motor 6 based on the detection result obtained by the conveyance encoder 813 and the target rotational speed of the conveyance motor 6. The control unit 802 switches the drive control of the conveyance motor 6 in accordance with the position of a sheet S2 when starting a conveying operation in a consecutive feeding operation (to be described later).

Figure 9:
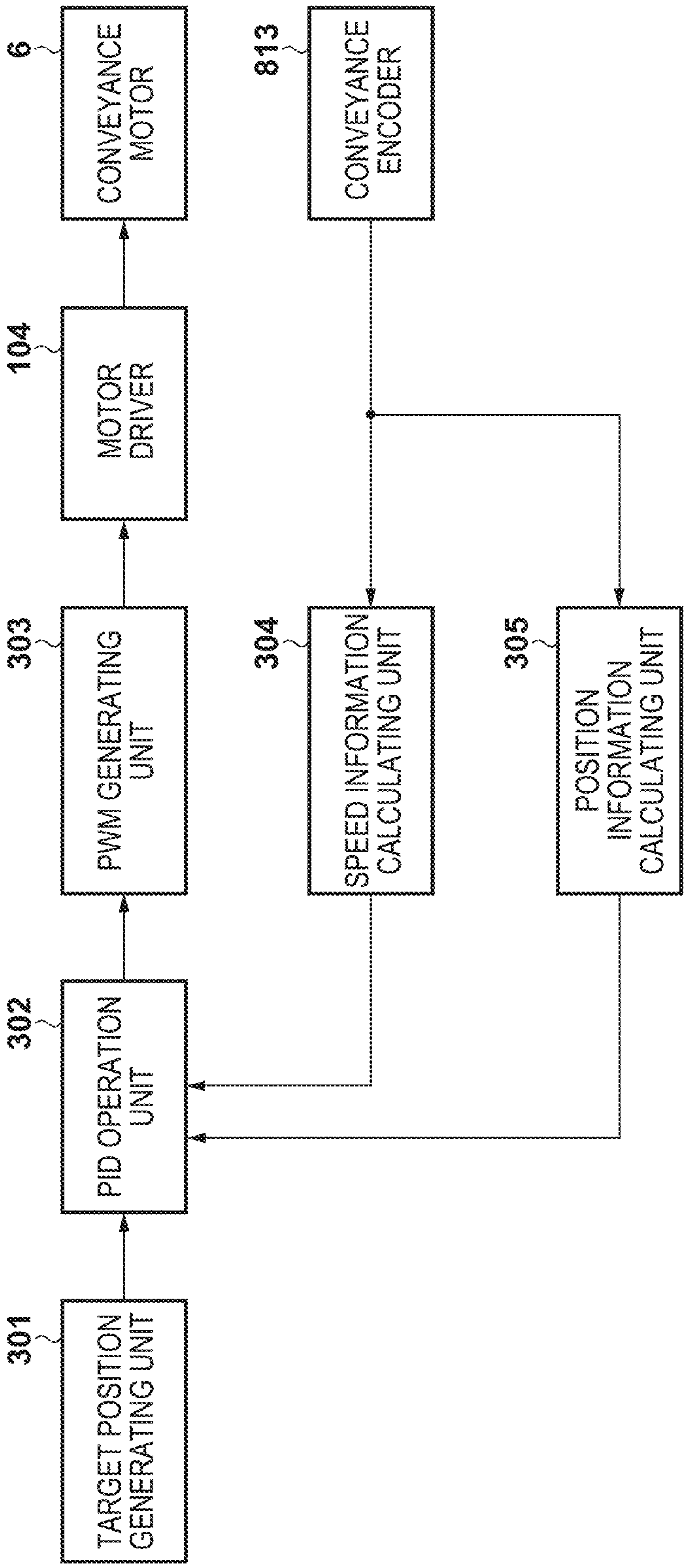
FIG. 9 is a view showing the control arrangement of a conveyance motor.

FIG. 9 is a view showing the control arrangement of the conveyance motor 6. In this embodiment, the control unit 802 controls the conveyance motor 6 by servo control. For example, the control unit 802 loads and executes a program stored in the storage unit 803, thereby implementing functions as a target position generating unit 301, a Proportional-Integral-Differential (PID) operation unit 302, a Pulse Width Modulation (PWM) generating unit 303, a speed information calculating unit 304, and a position information calculating unit 305. Alternatively, dedicated circuits functioning as respective units may be provided. Servo control shown in FIG. 9 is merely an example, and another control form may also be used.

For each servo control, the target position generating unit 301 generates the target position value which gradually increases as time progresses until the target stop position of the conveyance motor 6. The target position is, for example, a position where printing on a sheet 201 by the print head 71 is started.

The PID operation unit 302 calculates the energy to be given to the motor by PID operation from the target position generated by the target position generating unit 301, the speed of the motor obtained from the speed information calculating unit 304, and the position of the motor obtained from the position information calculating unit 305. In servo control, a method using a PID operation for performing an operation on a proportional term P, an integral term I, and a differential term D is generally used.

The PWM generating unit 303 calculates the PWM value to be set to a motor driver 104 from the operation result of the PID operation unit 302. The PWM value is the temporal ratio of the ON pulse width and the OFF pulse width within a predetermined time, and ranges from 0% to 100%. The larger the PWM value, the larger the power to be supplied to the motor.

The speed information calculating unit 304 calculates the rotational speed of the conveyance motor 6 from the rotational angle of the conveyance motor 6 based on the detection result of the conveyance encoder 813, and the time measurement value of a timer incorporated in the printing apparatus 1 or the like.

The position information calculating unit 305 accumulates the rotational angle of the conveyance motor 6 based on the detection result of the conveyance encoder 813, and calculates the position information of the conveyance motor 6.

In this manner, using the detection results of the conveyance encoder 813, the above-described speed information calculating unit 304 calculates the rotational speed of the conveyance motor 6, and the position information calculating unit 305 calculates the position information of the conveyance motor 6. Note that the conveyance encoder 813 is formed from an optical sensor including a light emitting unit configured to emit light and a light receiving unit configured to receive light, and a code wheel including holes which transmit light. The code wheel is attached coaxially with the rotation axis of the conveyance motor 6. Note that the encoder may be configured to detect the physical rotation of the conveyance roller 51.

<1.2. Outline of Printing Operation>

Figure 10:
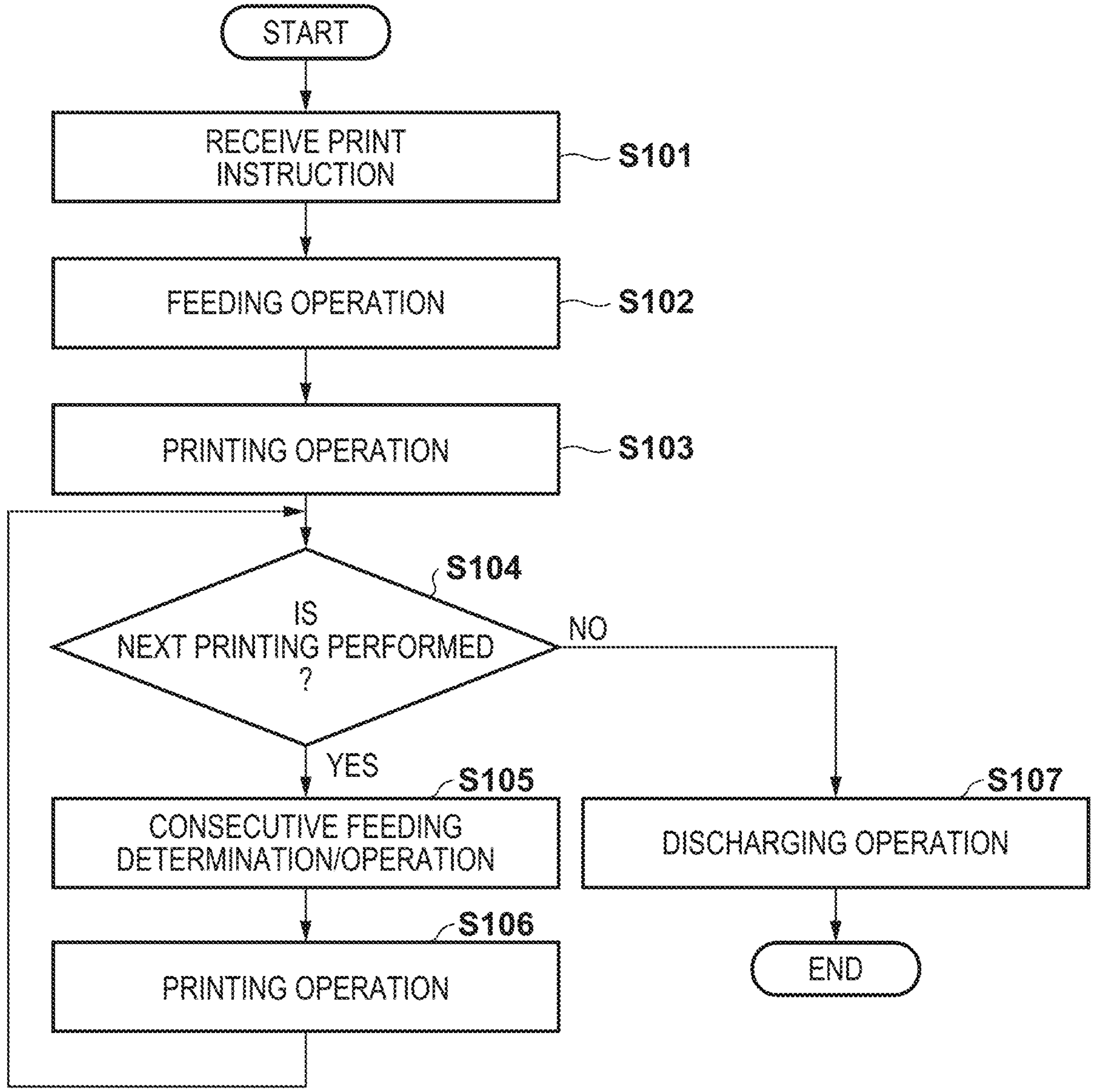
FIG. 10 is a flowchart showing an outline of a printing operation.

FIG. 10 is a flowchart showing an outline of the printing operation of the printing apparatus 1.

In step S101, the control unit 802 receives a print instruction. The control unit 802 receives a print instruction from the user via the operation unit 805 or the input device 801.

In step S102, the control unit 802 performs a feeding operation. The control unit 802 causes the conveyance motor 6 to drive the feeding unit 2 to feed the uppermost sheet of the sheets stacked on the stacking portion 101 to the conveying unit 5. In step S103, the control unit 802 causes the printing unit 7 to perform printing on the sheet conveyed to the conveying unit 5. In this case, the printing unit 7 performs one-pass printing while moving the print head 71 in the widthwise direction of the sheet.

In step S104, the control unit 802 determines whether to perform the next printing by using the printing unit 7. The next printing in this case is one-pass printing to be performed after the sheet on which one-pass printing has been performed in step S103 is fed by a predetermined amount. If the control unit 802 performs printing on the next printing, the process advances to step S105. Otherwise, the process advances to step S107. If, for example, the control unit 802 has performed printing on the entire print region of the sheet, the process advances to step S107.

In step S105, the control unit 802 executes consecutive feeding determination/operation. This determination/operation will be described in detail later. If it is determined that the consecutive feeding operation is performed, the control unit 802 causes the conveyance motor 6 serving as the common drive source to convey the sheet during printing and feed the succeeding sheet. On the other hand, if it is determined that the consecutive feeding operation is not performed, the control unit 802 conveys the sheet during printing alone.

In step S106, the control unit 802 executes printing on the sheet. In this case, as in step S103, the control unit 802 performs one-pass printing while moving the print head 71 in the widthwise direction of the sheet.

After the printing operation in step S106, the control unit 802 returns to step S104. That is, the control unit 802 performs printing on the entire print region of the sheet by repeating steps S104 to S106.

In step S107, the control unit 802 performs a discharging operation. The control unit 802 causes the conveyance motor 6 to drive the discharge roller 53 to discharge the sheet having undergone printing to the discharge tray 81. Thereafter, the control unit 802 ends the printing operation. Although FIG. 10 shows the printing operation on one sheet, the control unit 802 repeats this flowchart until the completion of printing on all the pages included in the print job.

Note that if the control unit 802 detects an abnormality during the execution of the above procedure by using the end portion detection lever 57, the stacking detection sensor 808, the conveyance encoder 813, or the like, the control unit 802 displays an error indication and an instruction to the user on the display unit 806. Error types include, for example, a paper jam error, a no paper error, and no ink error.

Figure 11:
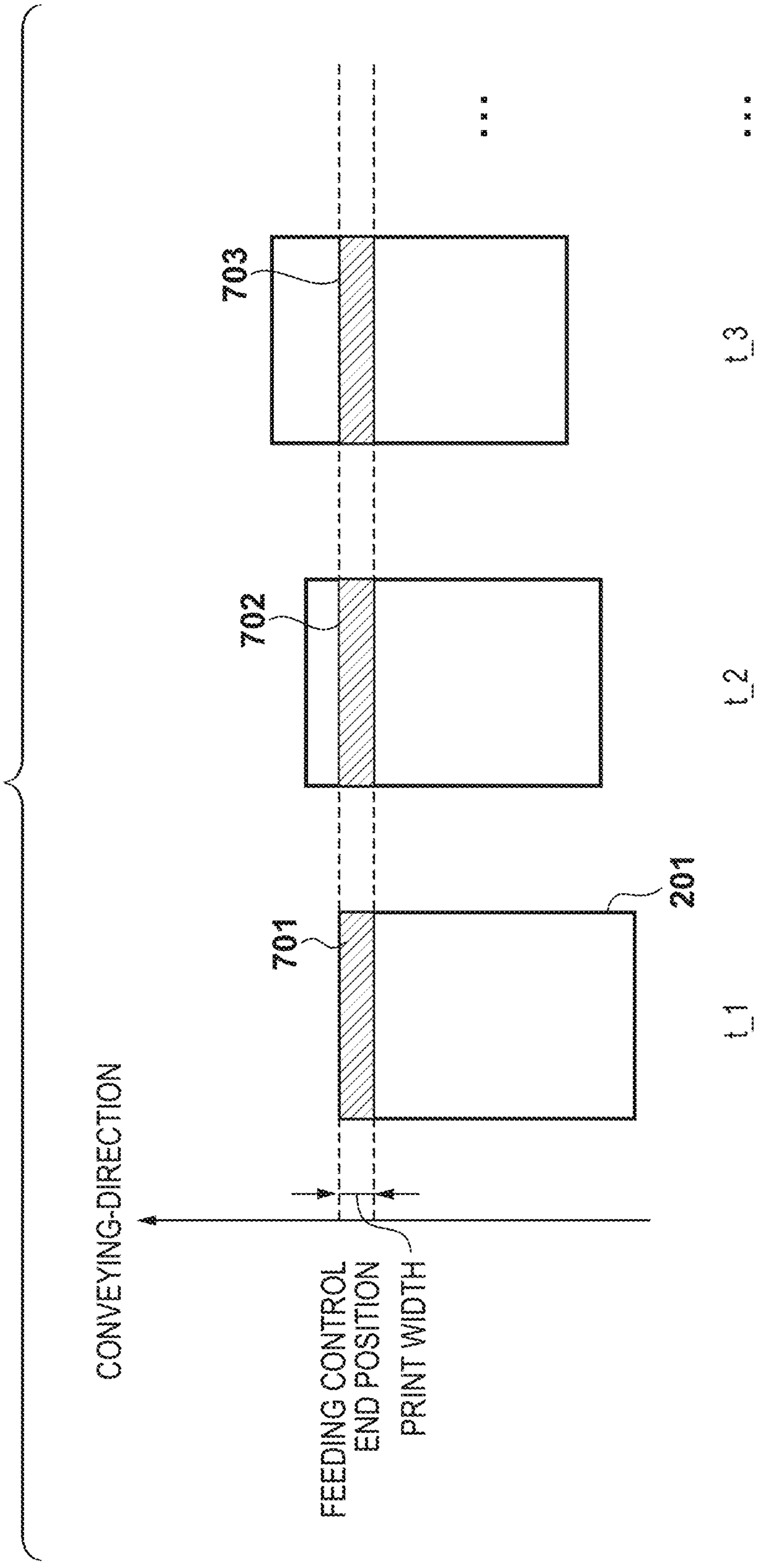
FIG. 11 is a view for explaining a conveying operation for one pass in the printing operation.

FIG. 11 is a view for explaining the conveying operation for one pass in the printing operation. The control unit 802 repeats the process of the flowchart of FIG. 10 to repeat conveyance of the sheet 201 as the sheet and printing for the width of the print head 71, thereby executing printing on the entire print region of the sheet 201. First, at a timing t_1, the conveying unit 5 conveys the sheet 201 such that the leading end portion of the sheet 201 in the conveying direction fits within the print width of the print head 71. Then, the print head 71 performs printing on a print range 701 (S103). After that, at a timing t_2, the conveying unit 5 conveys the sheet 201 such that the end portion of the print range 701 on the conveying-direction upstream side at the timing t_1 is located at the downstream-side end portion of the print width of the print head 71 (S105). Then, the print head 71 performs printing on a print range 702 (S106). Further, at a timing t_3, the conveying unit 5 conveys the sheet 201 such that the end portion of the print range 702 on the conveying-direction upstream side at the timing t_2 is located at the downstream-side end portion of the print width of the print head 71 (S105). Then, the print head 71 performs printing on a print range 703 (S106). By repeating these operations, it is possible to perform printing on the entire print region of the sheet 201.

<1.3. Conveyance Control (Feeding Control and Holding Control)>

<1.3.1. Return of Sheet when Stopping Conveyance>

When repeating conveyance and stop of the sheet 201 for each print width in the printing operation as described above, a force (reaction force) in a direction opposite to the conveying direction may be applied to the sheet. This reaction force may be generated, for example, when a force in the direction opposite to the conveying direction is applied to the roller of the conveying unit 5 due to the torsion or the like of a drive transmission member that transmits the drive of the conveying unit 5, or may be generated due to the resistance of a member of the conveying unit 5 or the like upon stopping the sheet 201. Due to this reaction force, the temporarily stopped sheet 201 may be returned in the direction opposite to the conveying direction. If the sheet 201 is returned, a deviation in the conveying direction may be generated between the print target range on the sheet 201 and the range where printing is actually performed. This may cause a degradation in print quality. To prevent this, in this embodiment, conveyance control is performed by the process described below, thereby suppressing that the stopped sheet 201 is returned in the direction opposite to the conveying direction.

<1.3.2. Example of Process of Conveyance Control>

Figure 12:
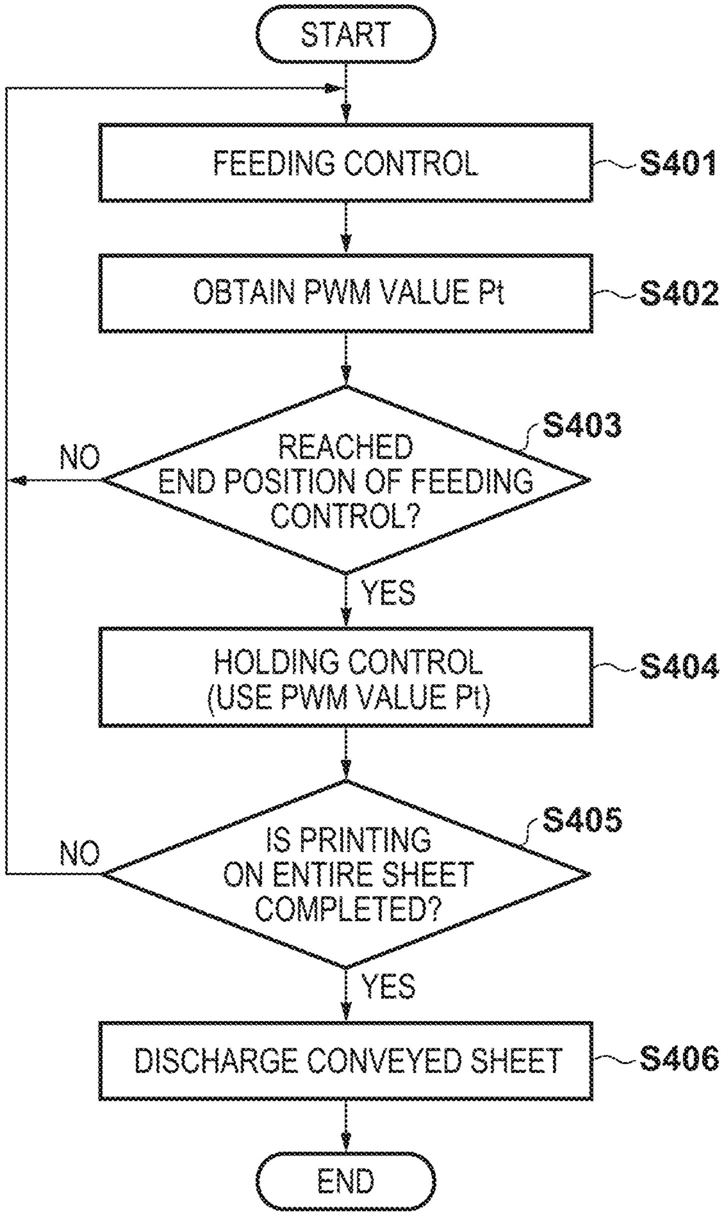
FIG. 12 is a flowchart showing an example of the process of a control unit.

FIG. 12 is a flowchart showing an example of the process of the control unit 802 in conveyance control. In this embodiment, conveyance control of the sheet 201 is performed by controlling the conveyance motor 6 for each predetermined cycle by the servo control shown in FIG. 9. Further, in this embodiment, conveyance control includes feeding control for conveying the sheet 201 by a predetermined distance, and holding control for stopping the sheet at a target position and holding the sheet at the target position. That is, the control unit 802 can execute feeding control and holding control. This flowchart illustrates the procedure until printing on one sheet 201 by the print head 71 ends.

In step S401, the control unit 802 executes feeding control of the sheet 201. For example, the control unit 802 executes the servo control shown in FIG. 9 for each control cycle of the conveyance motor 6 to operate the conveyance motor 6, thereby conveying the sheet 201 such as a paper sheet to the print position. For example, feeding control can be executed when conveying the sheet 201 from the cassette 100 to the print start position below the printing unit. In addition, for example, feeding control can be executed when conveying the sheet 201 by a distance corresponding to one pass of the print head 71 during the printing process, and the like.

In step S402, the control unit 802 acquires a PWM value Pt. The control unit 802 acquires the current PWM value of the conveyance motor 6 as the PWM value Pt. The control unit 802 stores the acquired PWM value Pt in a storage area of the storage unit 803. Note that if the PWM value Pt has been already stored in the storage unit 803, the control unit 802 updates the value stored in the storage unit 803 to the currently acquired value.

In step S403, the control unit 802 determines whether the sheet 201 has reached the end position of feeding control. If YES in step S403, the control unit 802 advances to step S404; otherwise, the control unit 802 returns to step S401. Note that the end position of feeding control is a position different from a target stop position (to be described later). More specifically, the end position of feeding control is a position before the target stop position by a predetermined amount. However, it is also possible to employ the configuration in which the end position of feeding control and the target stop position (before update) (to be described later) are set to the same position.

In this embodiment, steps S401 to S403 are repeated until the sheet 201 reaches the end position of feeding control. Accordingly, the control unit 802 advances to step S404 in a state in which the PWM value of the conveyance motor 6 is stored as the PWM value Pt in the storage unit 803 when the sheet 201 has reached the end position of feeding control. Note that the control unit 802 may repeat steps S401 and S403 until the sheet 201 reaches the end position of feeding control, and execute step S402 when the sheet 201 has reached the end position. That is, the order of steps S402 and S403 may be reversed.

In step S404, the control unit 802 executes holding control of the sheet 201. Holding control is control for stopping the rotating conveyance motor 6 at the target position, and holding the conveyance motor 6 at the stop position. When conveying the sheet 201, a force in the direction opposite to the conveying direction may be applied to the conveyance roller 51 due to an external force such as the resistance of a member of a conveyance mechanism or the like. Therefore, if servo control is terminated after the sheet 201 has reached the stop position, the conveyance motor 6 may be returned from the stop position in the reverse direction (a rotational direction opposite to the rotational direction for conveying the sheet 201 in the conveying direction). Hence, in this embodiment, the conveyance motor 6 is controlled by executing holding control even after the sheet 201 has reached the stop position, thereby suppressing that the position of the conveyance motor 6 is returned by an external force. The details of the holding control will be described later. In the holding control, the control unit 802 decides the PWM value of the conveyance motor 6 in accordance with the PWM value Pt acquired in step S402. With this, it is possible to control the conveyance motor 6 with an appropriate output value considering the external force acting on the conveyance roller 51.

In step S405, the control unit 802 checks whether printing on the entire print region of the sheet 201 is completed. If YES in step S405, the control unit 802 advances to step S406; otherwise, the control unit 802 returns to step S401. That is, the control unit 802 alternately executes feeding control and holding control until printing on the entire print region of the sheet 201 is completed. In other words, holding control is executed in a period from the end of the feeding control to the start of the next feeding control.

In step S406, the control unit 802 discharges the printed sheet 201 from the printing apparatus 1.

According to the process described above, since holding control is executed, it is possible to intermittently convey the sheet 201 by the predetermined distance while suppressing the return of the sheet 201 due to the reverse rotation of the conveyance motor 6 when stopped.

<1.3.3. Decision of Output Value of Motor in Holding Control>

Figure 13A:
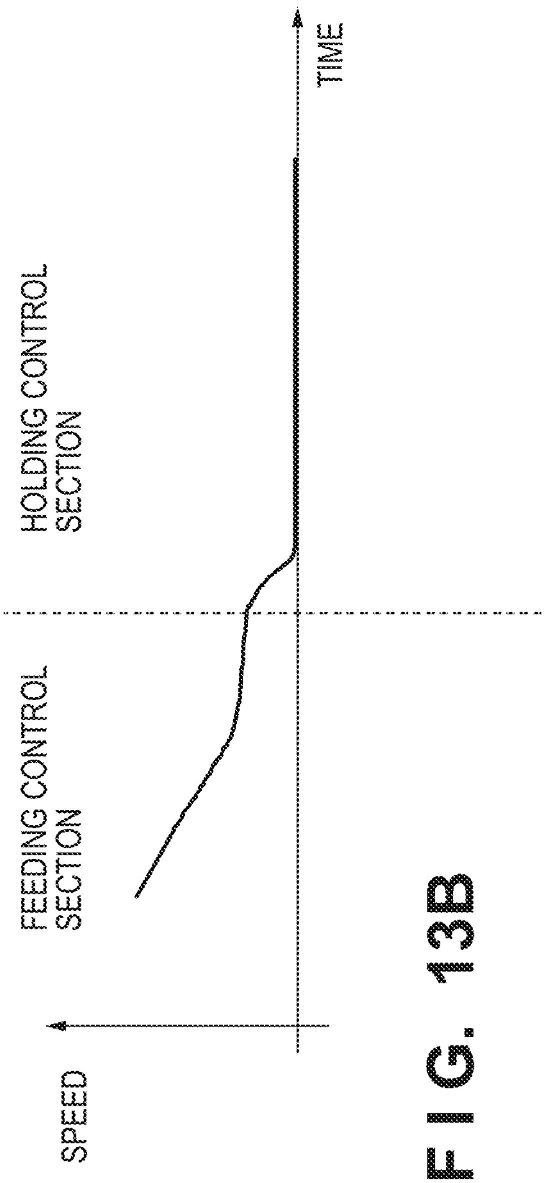
FIG. 13A is a view showing an example of the change in speed upon switching from feeding control to holding control.
Figure 13B:
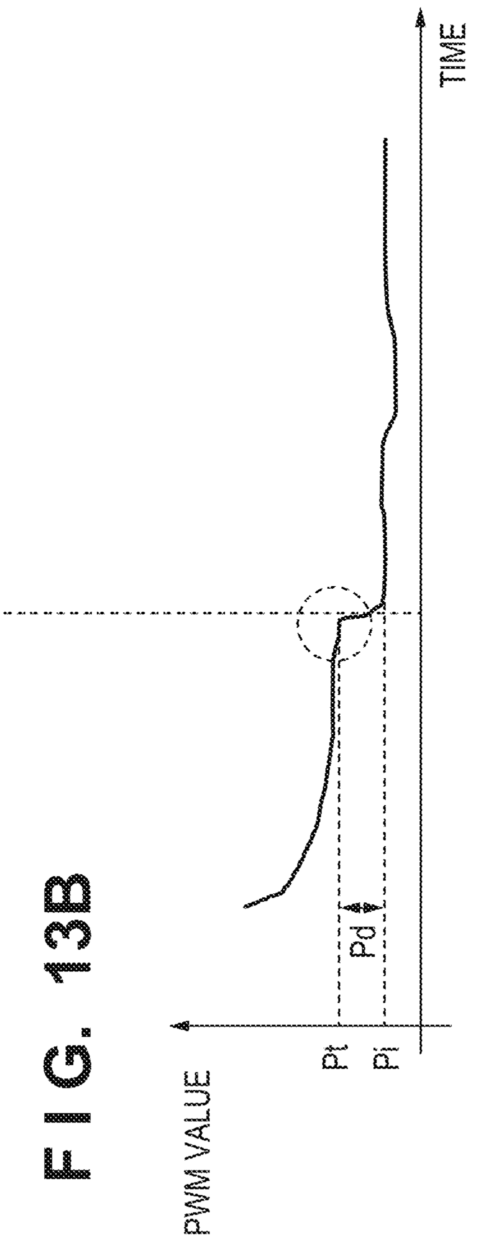
FIG. 13B is a view showing an example of the change of the PWM value upon switching from feeding control to holding control.

Next, decision of the output value of the control motor 6 in holding control, which is the feature of this embodiment, will be described. FIGS. 13A and 13B are views showing an example of the change in speed and an example of the change of the PWM value, respectively, upon switching from feeding control to holding control.

The conveying operation in feeding control is divided into an acceleration section in which the conveyance motor 6 accelerates the respective conveyance rollers of the conveying unit 5, a constant speed section in which the conveyance motor 6 is rotated at a constant speed, and a deceleration section in which the conveyance motor 6 is decelerated. Note that FIGS. 13A and 13B show the deceleration section in feeding control, and holding control. The PWM value of the conveyance motor 6 during feeding control is calculated by the PID operation unit 302 shown in FIG. 9 and generated by the PWM generating unit 303 such that the actual rotational position or rotational speed of the conveyance motor 6 matches the instructed rotational position or rotational speed.

At this time, the PID operation unit 302 performs the operation such that the conveyance motor 6 achieves the instructed rotational speed while receiving the drive load of the conveyance mechanism itself and the conveyance load of the sheet being conveyed. FIGS. 13A and 13B show the results. The conveyance load of the sheet being conveyed varies while the conveyance guide and the sheet are in contact with each other in the conveyance path. That is, the drive load required by the motor in the end portion of the deceleration section changes depending on the position of the conveyed sheet, and varies for each pass. Accordingly, the PWM value of the conveyance motor 6 required in the end portion of feeding control also varies.

On the other hand, as described above, at the end of the feeding operation, the conveyance motor 6 may be rotated in the reverse direction due to an external force. More specifically, this external force is generated when the torsion of a drive transmission member (not shown) driven while receiving the drive load is released to the conveyance motor 6 side when stopping. Particularly, in the arrangement in which the conveyance member on the conveyance upstream side such as the intermediate roller 3*a* or the pickup roller 111 is further connected to the conveyance roller 51 coupled to the conveyance motor 6, the variation increases. Due to this variation, the PWM value upon transition from feeding control to holding control may be deviated from the PWM value required to hold the conveyance motor 6. For example, if the PWM value of the conveyance motor 6 in holding control is set at a constant value, depending on the magnitude of the external force, the motor may rotate in the reverse direction due to an insufficient motor torque, or rotate in the forward direction due to an excessive motor torque.

To prevent this, in this embodiment, the PWM value at the start of holding control is adjusted based on the PWM value required to rotate the conveyance motor 6 at the instructed speed in the end portion of feeding control. With this adjustment, it is possible to bring the PWM value of the conveyance motor 6 closer to the appropriate PWM value corresponding to the external force at that time, thereby suppressing the reverse rotation and excessive forward rotation of the motor.

More specifically, a value obtained by subtracting a constant value Pd from the PWM value Pt at the end position of feeding control is used as a PWM value Pi at the start of holding control. That is, the initial PWM value Pi of holding control is calculated by:

$$Pi = Pt - Pd \quad (1)$$

for Pd>0

The PWM value Pt increases as the external force applied to the conveyance motor 6 in the end portion of feeding control increases. Accordingly, the initial PWM value Pi also increases as the external force applied to the conveyance motor 6 in the end portion of feeding control increases. Thus, when the initial PWM value Pi of holding control is decided in accordance with the final PWM value Pt, it is possible to more appropriately decide the output value of the conveyance motor 6 in holding control. With this, in holding control, the reverse rotation of the motor due to an insufficient motor torque, and the forward rotation of the motor due to an excessive motor torque can be suppressed. That is, the output of the motor in holding control for holding the motor at the stop position can be more appropriately controlled than in the conventional technique.

Note that in this embodiment, the example has been described in which the initial PWM value Pi is decided by subtracting the constant value Pd from the PWM value Pt at the time of reaching the end position of feeding control. However, a value obtained by dividing the PWM value Pt by a constant value Pd2 may be used as the initial PWM value Pi. That is, $$Pi = Pt/Pd2 \quad (2)$$

for Pd2>1

In other words, the initial PWM value Pi smaller than the PWM value Pt may be decided by performing a predetermined operation on the PWM value Pt. For example, in this embodiment, the initial PWM value Pi is calculated by subtracting the constant value Pd from the PWM value Pt, but the value to be subtracted from the PWM value Pt may change depending on the type, size, thickness, basis weight, or the like of a sheet.

Further, in this embodiment, the control unit 802 acquires, as the PWM value Pt in the end portion of feeding control, the PWM value of the conveyance motor 6 at the time of reaching the end position of feeding control. However, another method can also be employed as the method of acquiring the PWM value Pt. For example, the control unit 802 may acquire, as the PWM value Pt, the average value of the PWM values generated by the PWM generating unit 303 in a predetermined number of control cycles until reaching the end position of feeding control. That is, the PWM value Pt in the end portion of feeding control may be based on the PWM values in a predetermined period including the end of feeding control. Furthermore, it is only required that the PWM value Pt in the end portion of feeding control is acquired such that the load to be generated on the conveyance motor 6 in holding control based on the conveyance load generated on the conveyance motor 6 in feeding control can be grasped.

<1.3.4. Specific Example of Holding Control>

Figure 14:
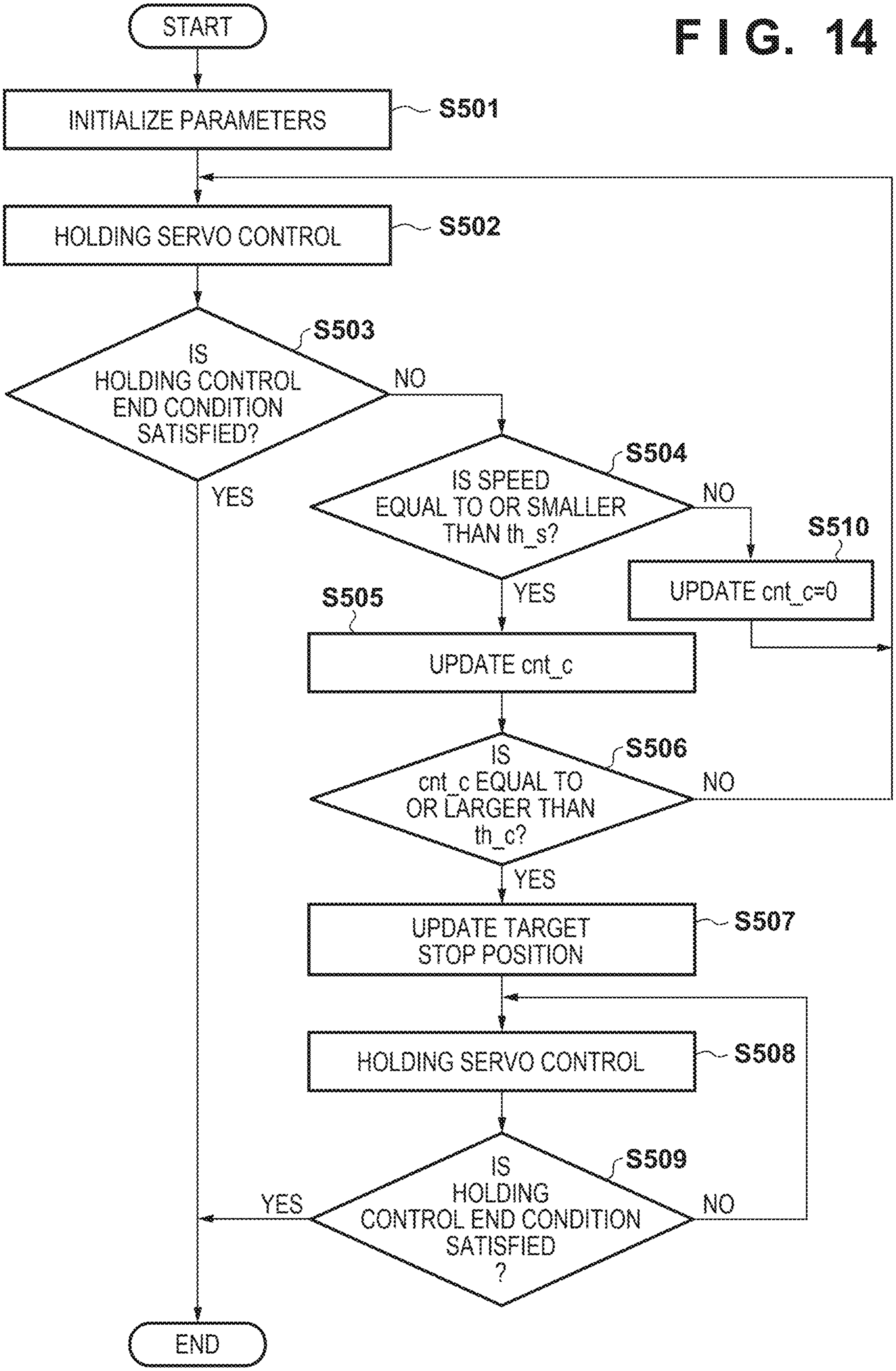
FIG. 14 is a flowchart showing an example of the process of the control unit.

Next, holding control will be further described. FIG. 14 is a flowchart showing an example of the process of the control unit 802, and shows a specific example of step S404 (holding control) in FIG. 12.

In step S501, the control unit 802 initializes parameters used in holding control. In this manner, the control unit 802 initializes the target position each time holding control is executed. In this embodiment, parameters to be initialized are a target stop position pos_t, a consecutive stop count cnt_c, and a holding control continuation count cnt_k.

The target stop position pos_t is the target stop position in holding control, and initialized to a value obtained by adding a predetermined value to the end position of feeding control used in step S403 in FIG. 12. The target stop position pos_t is used in holding servo control in step S508 (to be described later). The consecutive stop count cnt_c is the count of the consecutive states in which the rotational speed of the motor is equal to or smaller than a threshold value. The consecutive stop count cnt_c is initialized to 0. The consecutive stop count cnt_c is used in steps S505 and S506 (to be described later). The holding control continuation count cnt_k is the count of the state in which the holding state is continued. The holding control continuation count cnt_k is initialized to 0. The holding control continuation count cnt_k is used in step S503 (to be described later).

In step S502, the control unit 802 performs holding servo control based on the target stop position pos_t calculated in step S501. Here, control for one control cycle to locate the conveyance motor 6 at the target position is performed.

In step S503, the control unit 802 determines whether the holding servo control end condition is satisfied. If YES in step S503, the process ends; otherwise, the control unit 802 advances to step S504. In this embodiment, it is determined that the holding control end condition is satisfied if one of following three conditions is satisfied:

- a next feeding control instruction is received (condition A);
- the difference between the current position of the motor and the target stop position is equal to or larger than a threshold value th_p (condition B); and
- the consecutive operating time of holding control is equal to or larger than a threshold value th_k (condition C).

The respective conditions will be described below.

The condition A is a condition for performing next feeding control. If a next feeding control instruction is received, the holding control is terminated, and feeding control for performing next conveyance is started.

The condition B is a condition for, if an operation such as taking out the sheet 201 occurs, preventing holding control from hindering the operation. Since holding control is control for holding the rotational position of the motor, it may be difficult to take out the sheet 201 in a state in which holding control is operated. In this embodiment, if a current position pos_n, a target position p_t, and the threshold value th_p satisfy following equation (3), it is determined that an external force (for example, a force to pull out the sheet 201) larger than the external force causing return of the stop position is received, and the holding control is terminated. The threshold value th_p is a value set based on the external force assumed during conveyance. If holding control is normally operated, following equation (3) is not satisfied.

$$pos\_t > pos\_n + th\_p \tag{3}$$

In this manner, if the stopped conveyance motor 6 rotates by the amount equal to or larger than the threshold value th_p, the control unit 802 terminates the holding control even before the next feeding control is started.

The condition C is a condition for preventing that holding control is continued even in a case of occurrence of an abnormality of the apparatus or the like. Holding control of this embodiment is a process of applying power to the motor. Therefore, without the condition C, even in a case of occurrence of an abnormality of the apparatus, if a situation not satisfying the above-described conditions A and B continues, power also continues to be applied to the motor. This increases the load on the motor. In this embodiment, if the holding control continuation count cnt_k and the threshold value th_k satisfy following equation (4), it is determined that normal holding control cannot be executed, and the holding control is terminated. The threshold value th_k is a value that does not satisfy following equation (4) if holding control is normally operated. Accordingly, for example, the threshold value th_k is set to be longer than the period in which the carriage 72 and the print head 71 perform one-pass printing.

$$cnt\_k > th\_k \tag{4}$$

In this manner, if the stop state of the conveyance motor 6 continues for a predetermined time or more, the control unit 802 terminates the holding control even before the next feeding control is started.

As has been described above, in the normal state, the control unit 802 terminates the holding control based on the instruction to start the next feeding control. On the other hand, if the predetermined condition is satisfied, the control unit 802 terminates the holding control even before the next feeding control is started.

In step S504, the control unit 802 determines whether the rotational speed of the conveyance motor 6 is equal to or smaller than a threshold value th_s. If YES in step S504, the control unit 802 advances to step S505; otherwise, the control unit 802 advances to step S510. That is, if a rotational speed spd_n of the conveyance motor 6 and the threshold value th_s satisfy following equation (5), the control unit 802 advances to step S505; otherwise, the control unit 802 advances to step S510.

$$spd\_n \leq th\_s \tag{5}$$

Here, the control unit 802 performs the determination to determine whether the conveyance motor 6 is in (substantially) the stop state. Accordingly, the threshold value th_s is set to 0 or a value close to 0 so that it is possible to determine that the conveyance motor 6 is in the stop state.

In step S505, the control unit 802 updates the consecutive stop count cnt_c by following equation (6).

$$cnt\_c=cnt\_c+1 \quad (6)$$

In step S506, the control unit 802 determines whether the consecutive stop count cnt_c is equal to or larger than a threshold value th_c. If YES in step S506, the control unit 802 advances to step S507; otherwise, the control unit 802 returns to step S502. The threshold value th_c is a value for determining that the conveyance motor 6 has stopped. That is, if a state in which the rotational speed is equal to or smaller than the threshold value th_s continues for a predetermined period, the control unit 802 can determine that the conveyance motor 6 has stopped. If the consecutive stop count cnt_c is smaller than the threshold value th_c, the state in which the rotational speed of the conveyance motor 6 is equal to or smaller than the threshold value th_s has not continued long enough to determine that the conveyance motor 6 has stopped. Thus, the servo control is continued.

In step S507, the control unit 802 updates the target stop position pos_t. That is, the control unit 802 updates the target stop position pos_t to the current position where the stop state (the state in which the rotational speed is equal to or smaller than the threshold value th_s) of the conveyance motor 6 has continued for the predetermined period. The position where the stop state of the conveyance motor 6 continues is considered to be the position where the drive force of the conveyance motor 6 balances with the external force during conveyance. Therefore, if it is determined in step S506 that the consecutive stop count cnt_c is equal to or larger than the threshold value th_c, it can be considered that the drive force of the conveyance motor 6 balances with the external force so that the conveyance motor 6 stops. In this manner, the control unit 802 updates the target position to the current position based on the rotational speed of the conveyance motor 6 during execution of holding control.

Note that when the target stop position pos_t is updated by this step, there can be a difference between the target stop position pos_t before update and the actual stop position. However, in the feeding control in step S401, by setting parameters used in the servo control such that the conveyance motor 6 stops at a moderate speed when reaching the end position of feeding control, the difference between the actual stop position and the target stop position pos_t becomes a sufficiently small value, which does not influence the print result. That is, the control unit 802 may transition to the holding control after decreasing the rotational speed of the conveyance motor 6 to the threshold value or less in the feeding control.

In step S508, the control unit 802 performs holding servo control (holding control) based on the target stop position pos_t updated in step S507. Here, control for one control cycle to locate the conveyance motor 6 at the target position is performed. However, through the preceding steps, the conveyance motor 6 is already stopped at the updated target stop position pos_t where the balance with the external force during conveyance is achieved. Therefore, the control unit 802 performs the servo control so as to hold the position of the conveyance motor 6 at the updated target stop position pos_t. At this time, the control unit 802 controls the drive of the conveyance motor 6 using the initial PWM value Pi decided by above equation (1). Note that the initial PWM value Pi can be decided at a predetermined timing. For example, the control unit 802 may decide (update) the initial PWM value Pi at the timing of acquiring the PWM value Pt in step S402 in FIG. 12. Alternatively, for example, the control unit 802 may decide (update) the initial PWM value Pi based on the PWM value Pt stored in the storage unit 803 at the timing of initializing the parameters in step S501.

In step S509, the control unit 802 determines whether the holding control end condition is satisfied. If YES in step S509, the process ends; otherwise, the control unit 802 returns to step S508. The processing in this step is similar to that in step S503. Until the end condition is satisfied, the position of the conveyance motor 6 is held at the updated target stop position pos_t by steps S508 and S509.

On the other hand, if the control unit 802 advances from step S504 to step S510, the control unit 802 updates the consecutive stop count cnt_c to 0. That is, since it is determined in step S504 that the motor is not in the stop state, the consecutive stop count cnt_c is set to 0 and counted again.

Figure 15A:
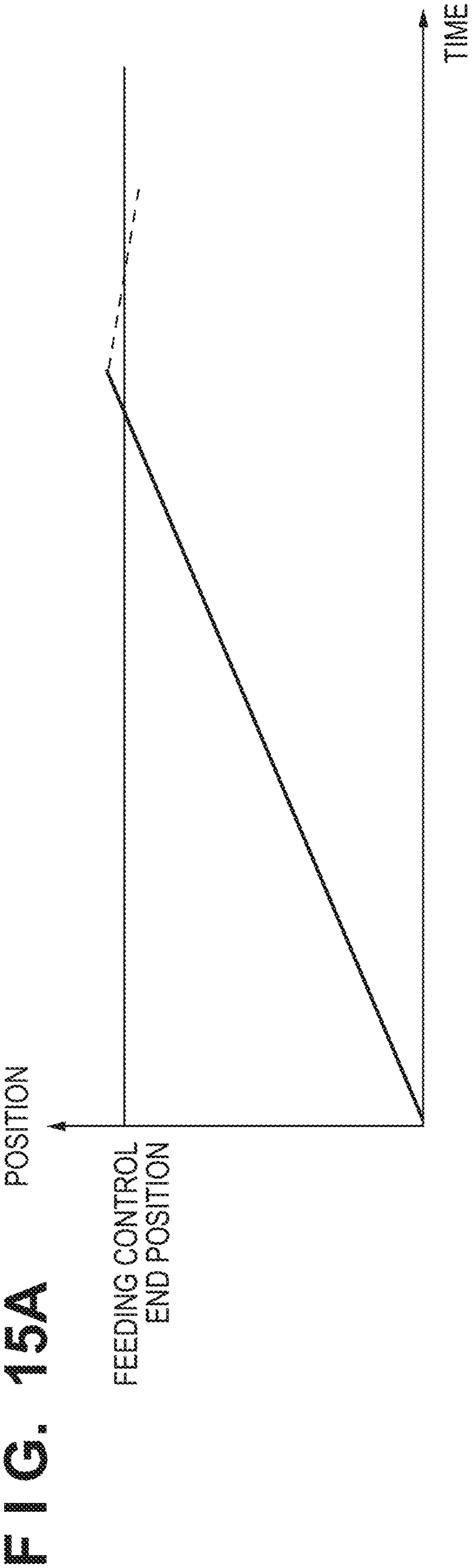
FIGS. 15A and 15B are views showing the comparison between a case of executing the holding control of this embodiment and a case of not executing the holding control.
Figure 15B:
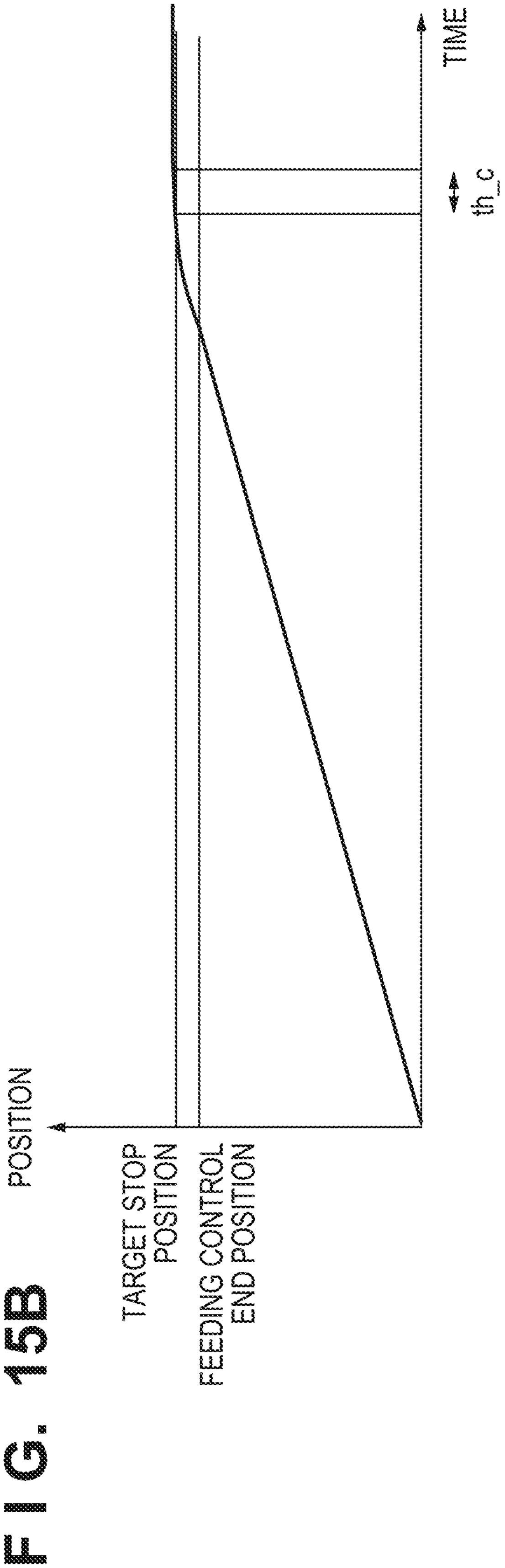

FIGS. 15A and 15B are views showing the comparison between a case of executing the holding control of this embodiment and a case of not executing the holding control.

FIG. 15A is a view showing the time and the change in position of the motor in the case of not executing the holding control of this embodiment, that is, in the case in which the stop position is returned by the external force. When the motor control ends after reaching the end position of feeding control, the conveyance motor 6 temporarily stops after rotating by a predetermined amount due to inertia, but may be returned from the stop position by the external force. In this manner, if the rotational position of the conveyance motor 6 is returned, the sheet 201 retreats in the direction opposite to the conveying direction. As a result, printing is performed at a position different from the original print position on the sheet 201, and a desired print result may not be obtained. As a specific example, in FIG. 11, the range where printing is performed at the timing t_1 and the range where printing is performed at the timing t_2 may overlap in the conveying direction. In this overlap portion, print streaks may occur. In this manner, in the printing apparatus 1, if the conveyance motor 6 does not stop at the desired stop position, a degradation in image quality of a printed product or the like may occur.

FIG. 15B is a view showing the time and the change in position of the motor in the case of executing the holding control of this embodiment. The position where the stop state of the motor has continued for the threshold value th_c is the position where the balance with the external force during conveyance is achieved. Accordingly, by performing holding servo control while setting this position as the updated target stop position pos_t, the rotational position of the conveyance motor 6 can be held without the reverse rotation of the conveyance motor 6.

Figure 16A:
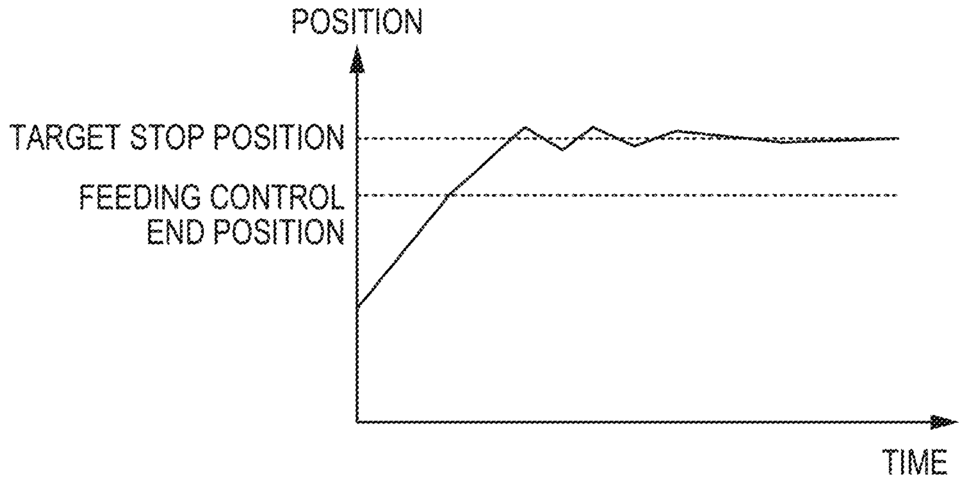
FIGS. 16A and 16B are views showing the further comparison between the case of executing the holding control of this embodiment and the case of not executing the holding control.
Figure 16B:
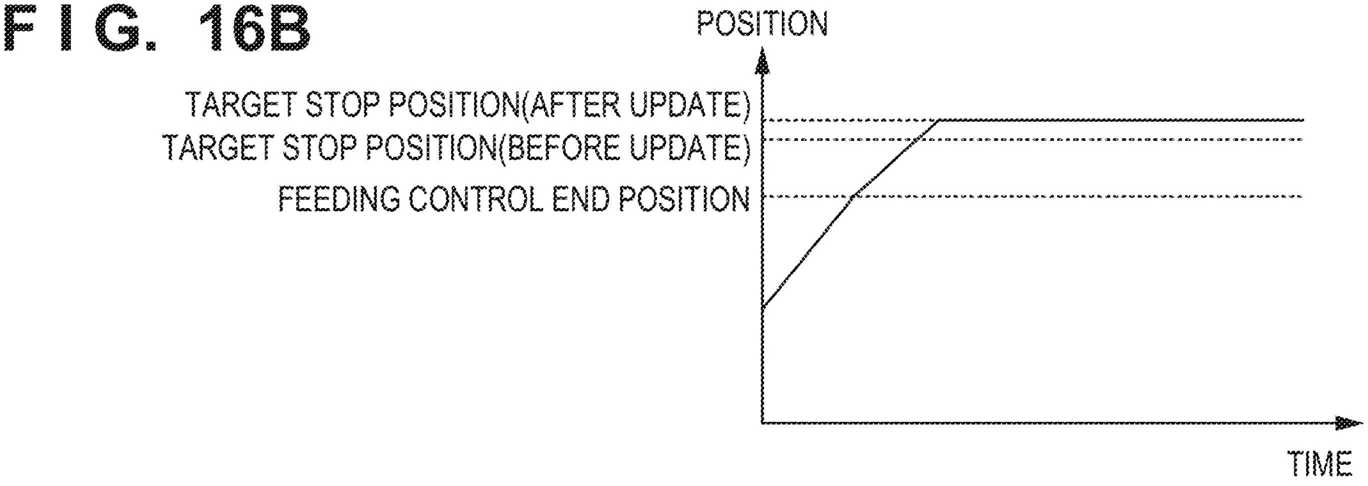

FIGS. 16A and 16B are views showing the further comparison between the case of executing the holding control of this embodiment and the case of not executing the holding control.

FIG. 16A shows the case of not executing the holding control of this embodiment, in which the deviation between the current position of the conveyance motor 6 and the target stop position is fed back to position control of the conveyance motor 6 so that the conveyance motor 6 stops at the target stop position. In this case, if the conveyance motor 6 stops beyond the target stop position, the conveyance motor 6 is controlled to rotate in the reverse direction to make the conveyance motor 6 stop at the target stop position. Due to the reverse rotation of the conveyance motor 6, the sheet 201 may be bent. Alternatively, as the conveyance motor 6 repeats forward rotation and reverse rotation, backlash may occur in the power transmission system.

FIG. 16B is a view showing the time and the change in position of the motor in the case of executing the holding control of this embodiment. FIG. 16B is a partially enlarged view of FIG. 15B. In this embodiment, even if the conveyance motor 6 exceeds the target stop position, the target position is updated at the time when the conveyance motor 6 stops. Therefore, in the holding control, control is performed so as to hold the current position where the conveyance motor 6 stops. Accordingly, the reverse rotation of the conveyance motor 6 as shown in FIG. 15A can be suppressed.

As has been described above, according to this embodiment, by executing holding control when the conveyance motor 6 stops, the rotation of the conveyance motor 6 in the direction opposite to the conveying direction caused by the external force can be suppressed. Then, by updating the target stop position pos_t to the current position based on the rotational speed of the conveyance motor 6 during execution of the holding control, the rotation of the conveyance motor 6 in the direction opposite to the conveying direction caused by the control can also be suppressed. Thus, in the stop operation of the conveyance motor 6 for conveying the sheet 201, the rotation in the direction opposite to the conveying direction can be suppressed.

In this embodiment, since holding control is performed using the output (PWM value) corresponding to the external force during conveyance, more specifically, near the end of feeding control, it is possible to improve the stop accuracy during conveyance without the rotation of the conveyance motor 6 in the direction opposite to the conveying direction.

Note that in this embodiment, the method of updating the target stop position in holding control has been exemplified. However, it is only required that the initial PWM value Pi is decided based on the PWM value Pt, and the method of holding control at that time, more specifically, the method of stopping the sheet at the target stop position from the end position of feeding control is not limited to the method described above.

<1.4. Application of Initial PWM Value Pi during Holding Control in Consecutive Feeding Operation>

The initial PWM value Pi in holding control described above can be applied in a consecutive feeding operation. The consecutive feeding operation in this embodiment indicates an operation of concurrently performing a conveying operation for a sheet during printing (to be sometimes referred to as a sheet S1 hereinafter) and a conveying (feeding) operation for the next sheet (to be sometimes referred so as the sheet S2 hereinafter). This consecutive feeding operation makes it possible to quickly start the printing operation for the sheet S2 upon completion of the printing operation for the sheet S1, thereby shortening the time required for printing on a plurality of sheets.

On the other hand, in a consecutive feeding operation, the torque required for feeding sometimes varies depending on the position of the sheet S2 on the conveyance path CP. For example, viewing in the direction in FIG. 7, when the leading end of the sheet S2 in the conveying direction is located in a curved section in the conveying direction, the torque required for the leading end can be relatively larger than when the leading end is located in a straight section. If the required torque is large, the drive motor 6 may lack torque, the accuracy of conveying control may deteriorate, or the drive of the drive motor 6 may stop. Accordingly, in this embodiment, the following flowchart is used to perform a consecutive feeding operation while suppressing the occurrence of a shortage of torque. The initial PWM value Pi is applied in the holding control during the consecutive feeding operation.

<1.4.1. Example of Process of Control Unit in Consecutive Feeding Operation>

Figure 17:
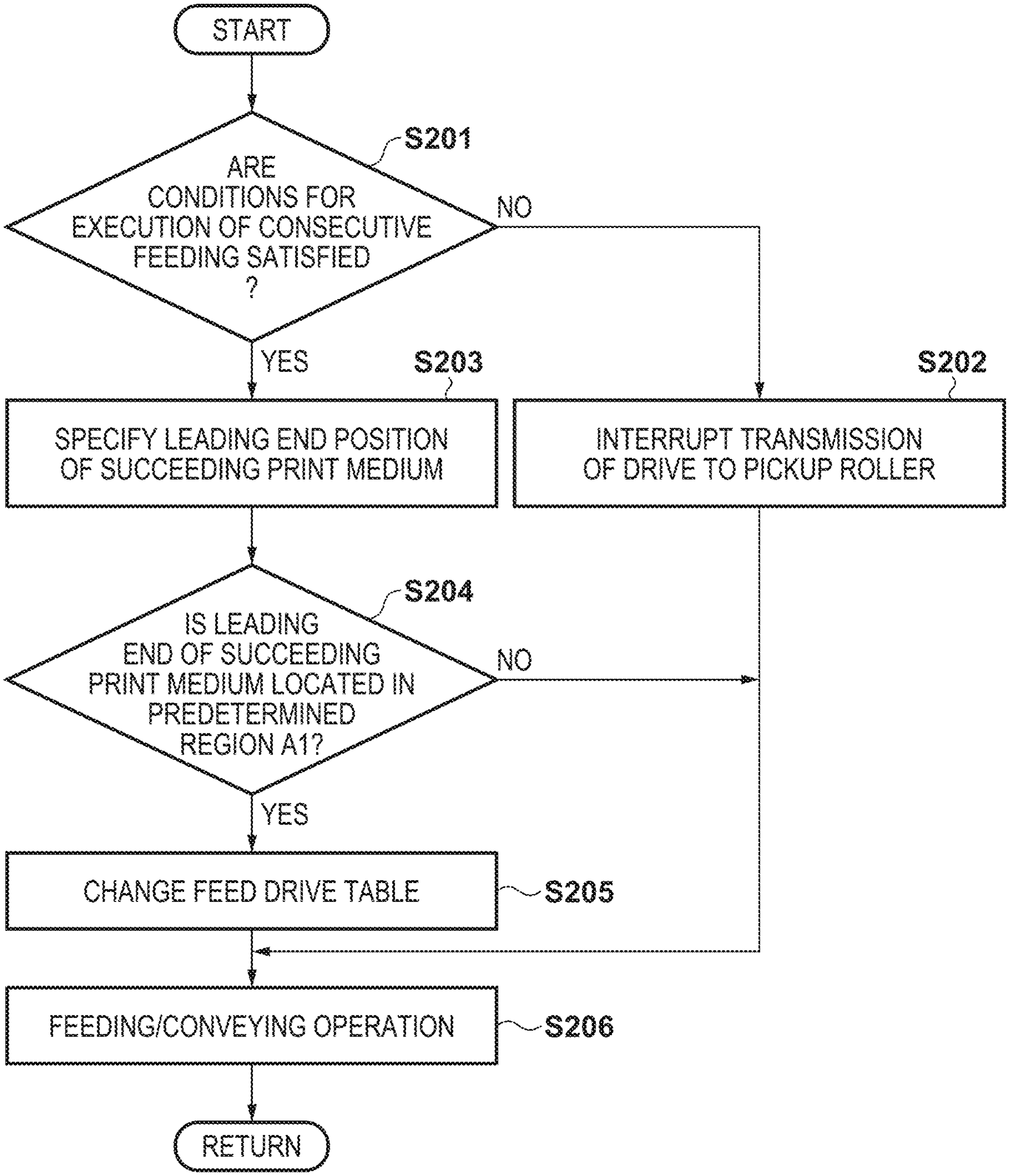
FIG. 17 is a flowchart showing a consecutive feeding operation in the printing apparatus.

FIG. 17 is a flowchart showing a consecutive feeding operation in the printing apparatus 1 and a specific example of processing in step S105 in FIG. 10.

In step S201, the control unit 802 determines whether the conditions for the execution of a consecutive feeding operation are satisfied. If YES in step S201, the process advances to step S203; otherwise, the process advances to step S202. For example, depending on the size, thickness, material, and basis weight of a sheet, the conveying speed at the time of printing, and the like, a large torque is required for the conveyance of a single sheet, and it is not sometimes appropriate to perform a consecutive feeding operation. Accordingly, the control unit 802 determines whether to perform a consecutive feeding operation based on information such as the size and type of sheet and a conveying speed setting at the time of printing obtained from a print job or the set information and the like of the printing apparatus 1 stored in the storage unit 803 or the like.

In step S202, the control unit 802 interrupts the transmission of drive from the conveyance motor 6 to the pickup roller 111. Subsequently, the control unit 802 advances to step S206. That is, the control unit 802 switches from a transmission state in which the drive force is transmitted from the conveyance motor 6 to the pickup roller 111 to a non-transmission state in which the drive force is not transmitted from the conveyance motor 6 to the pickup roller 111.

In step S203, the control unit 802 specifies the leading end position of the succeeding sheet S2. In this embodiment, the control unit 802 specifies the leading end position of the succeeding sheet S2 by using the detection result obtained by the end portion detection lever 57. More specifically, the control unit 802 specifies the leading end position of the sheet S2 based on the leading end position of the sheet S1 specified by the end portion detection lever 57, the length of the sheet S1 in the conveying direction, and the interval between the trailing end of the sheet S1 and the leading end of the sheet S2 in the conveying direction.

More specifically, first of all, the control unit 802 obtains a conveyance amount d1 of the sheet S1 since the detection of the leading end of the sheet S1 by the end portion detection lever 57 from the detection result obtained by the conveyance encoder 813. The control unit 802 calculates a distance L1 from the detection position of the end portion detection lever 57 to the trailing end of the sheet S1 from the conveyance amount d1 and a length lp of the sheet. The length lp can be obtained from, for example, a set value or the like included in a print job.

The relationship among the conveyance amount d1, the length lp, and the distance L1 is expressed by $L1=lp-d1$. A distance L2 from the end portion detection lever 57 to the leading end of the sheet S2 can be expressed by $L2=lp-d1+pp$ by using this relationship and a delay amount pp of the gear train described above. This arrangement makes it possible to specify a leading end position P of the sheet S2 without providing any sensor or the like in a predetermined region A1.

In step S204, the control unit 802 determines whether the stop position P of the leading end of the sheet S2 is located in the predetermined region A1. If YES in step S204, the process advances to step S205; otherwise, the process advances to step S206.

In this embodiment, the predetermined region A1 is a region based on the conveyance load of a sheet. Furthermore, the predetermined region A1 is a region where the conveyance load becomes relatively high in a feeding operation for a sheet. More specifically, the predetermined region A1 in this embodiment is a region between the pickup roller 111 and the intermediate roller pair 3. When the inclined surface member 121 and the U-turn member 131 are located in the conveyance path CP between the pickup roller 111 and the intermediate roller pair 3 as in the embodiment, the conveyance load of a sheet becomes high in a curved section formed by these components. In this regard, in the embodiment, the curved section formed by path forming members such as the inclined surface member 121 and the U-turn member 131 can be set as the predetermined region A1.

Note that the region where the conveyance load becomes high is not limited to this depending on the arrangements and numbers of various rollers and conveyance guide members. In addition, there may be a plurality of regions where the conveyance loads are high.

Whether the stop position P of the leading end of the sheet S2 is located in the predetermined region A1 can be determined as follows. Assume that the distance from the end portion detection lever 57 to the intermediate roller pair 3 is a distance Ps1, and the distance from the end portion detection lever 57 to the pickup roller 111 is a distance Ps2. In this case, if the distance L2 from the end portion detection lever 57 to the leading end of the sheet S2 satisfies Ps1<L2<Ps2, it can be determined that the stop position is located in the predetermined region A1.

In step S205, the control unit 802 changes the feed drive table. For example, the control unit 802 changes the feed drive table to a table with a low acceleration.

FIG. 28 shows an example of feed drive tables. In this case, table 1 is a table to be used when a consecutive feeding operation is not performed or when the leading end position of the sheet S2 is located outside the predetermined region A1 in a case in which a consecutive feeding operation is to be performed. Table 2 is a table to be used when a consecutive feeding operation is to be performed and the leading end position of the sheet S2 is located in the predetermined region A1. The control unit 802 changes the feed drive table from table 1 to table 2. Table 2 is the same as table 1 in the rotational speed of the conveyance motor 6 at the time of constant-speed rotation, but the acceleration is set to be lower than in table 1. That is, when the leading end of the sheet S2 is located in the predetermined region A1, the control unit 802 switches the drive control of the conveyance motor 6 so as to reduce the acceleration of the conveyance motor 6 to an acceleration lower than that when the leading end is not located in the predetermined region A1.

Note that in this case, the control unit 802 changes the acceleration of the conveyance motor 6. When, however, the leading end of the sheet S2 is located in the predetermined region A1, control may be performed to limit the drive (output) of the conveyance motor 6 as compared when the leading end is not located in the predetermined region A1. For example, when the leading end of the sheet S2 is located in the predetermined region A1, the control unit 802 may switch the drive control of the conveyance motor 6 to reduce the rotational speed of the conveyance motor 6 to a speed lower than that when the leading end is not located in the predetermined region A1. Note that the rotational speed in this case is a rotational speed at the time of constant-speed rotation after acceleration. Alternatively, when the leading end of the sheet S2 is located in the predetermined region A1, the control unit 802 may switch the drive control of the conveyance motor 6 so as to reduce both the acceleration and the rotational speed of the conveyance motor 6 to an acceleration and a speed lower than those when the leading end is not located in the predetermined region A1.

In step S206, the control unit 802 performs a feeding/conveying operation. In this case, if conditions for the execution of a consecutive feeding operation are not satisfied (S201: No), since the transmission of drive to the pickup roller 111 is interrupted (S202), only a conveying operation for the preceding sheet S1 is performed. Alternatively, if the conditions for the execution of a consecutive feeding operation are satisfied (S201: Yes) and the leading end of the sheet S2 is located in the predetermined region A1 (S204: Yes), a consecutive feeding operation is performed after the feed drive table is changed. That is, a consecutive feeding operation is performed while the drive of the conveyance motor 6 is limited. Alternatively, if the conditions for the execution of a consecutive feeding operation are satisfied (S201: Yes) and the leading end of the sheet S2 is not located in the predetermined region A1 (S204: No), a consecutive feeding operation is performed without any change in the feed drive table. That is, a consecutive feeding operation is performed while the drive of the conveyance motor 6 is not limited. Subsequently, the control unit 802 ends the flowchart.

As described above, in this embodiment, the drive control of the conveyance motor 6 is switched in accordance with the position of the succeeding sheet S2. Accordingly, it is possible to execute a consecutive feeding operation while suppressing the occurrence of a shortage of torque in the conveyance motor 6. That is, it is possible to more effectively perform the drive control of the drive source that drives a plurality of conveying units.

<1.4.2. Application of Initial PWM Value Pi Corresponding to External Force During Consecutive Feeding Drive>

In a case of performing the above-described consecutive feeding operation by the single conveyance motor 6, the load upon feeding the succeeding sheet S2 influences the feeding control of the preceding sheet S1. That is, in the holding control after the feeding control of the preceding sheet S1, the variation of the external force applied to the conveyance motor 6 also depends on the position of the succeeding sheet S2 in the conveyance path.

More specifically, the external force (return force) is large when the leading end of the succeeding sheet S2 is located in the region of the conveyance region A1. Particularly, if the deceleration region of the preceding sheet S1 is about to start when the leading end of the succeeding sheet S2 is caught among the protrusions 122*a* of the separation piece 122, the external force (return force) becomes large near the end portion of feeding control depending on the rigidity of the sheet. If the deceleration region of the preceding sheet S1 is about to start when the leading end of the succeeding sheet S2 reaches near the U-turn exit of the conveyance path and the curvature of the succeeding sheet S2 increases, the external force (return force) becomes large near the end portion of feeding control depending on the rigidity of the sheet.

Therefore, in this embodiment, the PWM value at the start of holding control is adjusted based on the PWM value required to rotate the conveyance motor 6 at the instructed speed in the end portion of feeding control in a conveyance region A1 where the load is high and the phenomena as described above occur. With this adjustment, it is possible to bring the PWM value of the conveyance motor 6 closer to the appropriate PWM value corresponding to the external force at that time, thereby suppressing the reverse rotation and excessive forward rotation of the motor.

More specifically, the initial PWM value Pi of holding control can be decided based on equation (1) (or equation (2)) described above.

Note that in a case in which the leading end of the succeeding sheet S2 is not located in the conveyance region A1, the PWM value in the end portion of feeding control becomes relatively small. In such the case, as a result of subtracting the constant value from the PWM value Pt based on equation (1), if the initial PWM value Pi is smaller than 0, the output value of the conveyance motor 6 in holding control may be regarded as 0 and the same control may be executed.

The constant value Pd in equation (1) may be changed between the case in which the leading end of the succeeding sheet S2 is located in the conveyance region A1 and the case in which the leading end of the succeeding sheet S2 is not located in the conveyance region A1. Furthermore, the constant value Pd in the case in which the leading end of the succeeding sheet S2 is not located in the conveyance region A may be set smaller than the constant value Pd in the case in which the leading end of the succeeding sheet S2 is located in the conveyance region A1. Alternatively, in the case in which the leading end of the succeeding sheet S2 is not located in the conveyance region A1, application of the initial PWM value Pi based on equation (1) may not be executed.

Further, in a case of conveyance in which an external force is less applied due to the type and speed during conveyance of the conveyed sheet, setting of ON/OFF of the consecutive feeding operation, and the like, the initial PWM value Pi of holding control may be changed to a second value Pi2 (<Pi1). Alternatively, in the case of conveyance in which an external force is less applied, application of the initial PWM value Pi may not be executed.

<1.5. Adjustment Control of PWM Value for Load Variation>

Subsequently, adjustment control for load variation during deceleration will be described. In the consecutive feeding operation, the deceleration operation or stop operation of the preceding sheet may be performed when the leading end of the succeeding sheet is caught among the protrusions 122*a* of the separation piece 122. In this case, depending on the rigidity of the sheet, the leading end of the succeeding sheet may come off from the protrusions 122*a* near the end portion of feeding control. If the leading end of the succeeding sheet comes off from the protrusions 122*a*, the conveyance load on the conveyance motor 6 may be suddenly reduced.

Figure 18A:
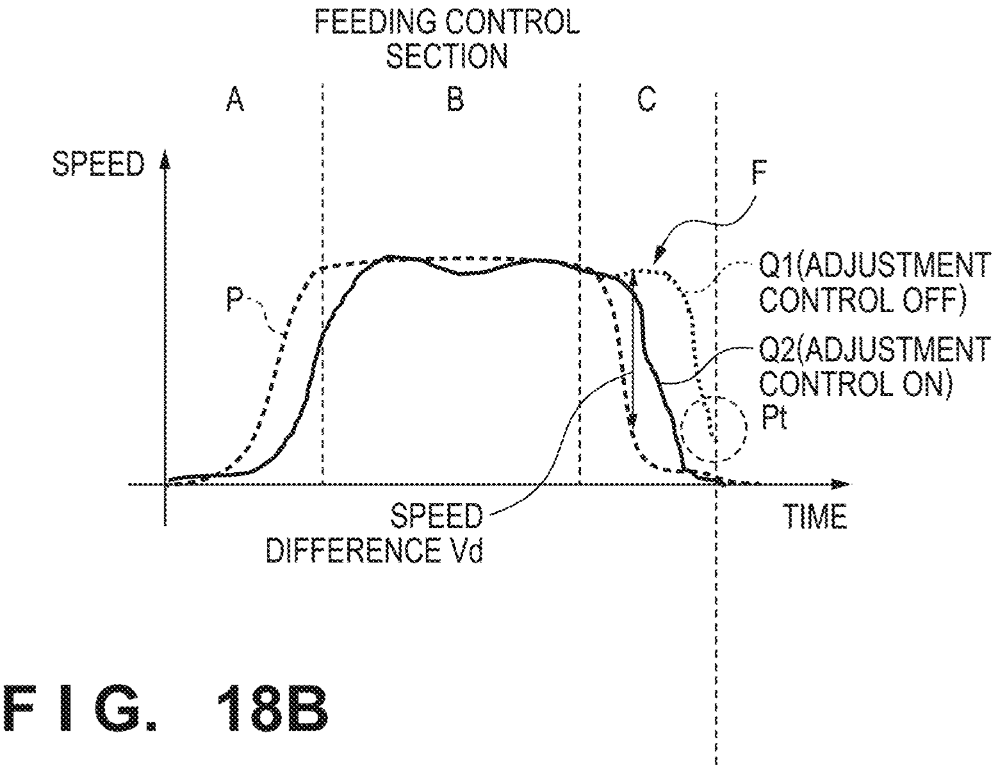
FIGS. 18A and 18B are graphs showing the change in speed and the change of the PWM value, respectively, of the conveyance motor.
Figure 18B:
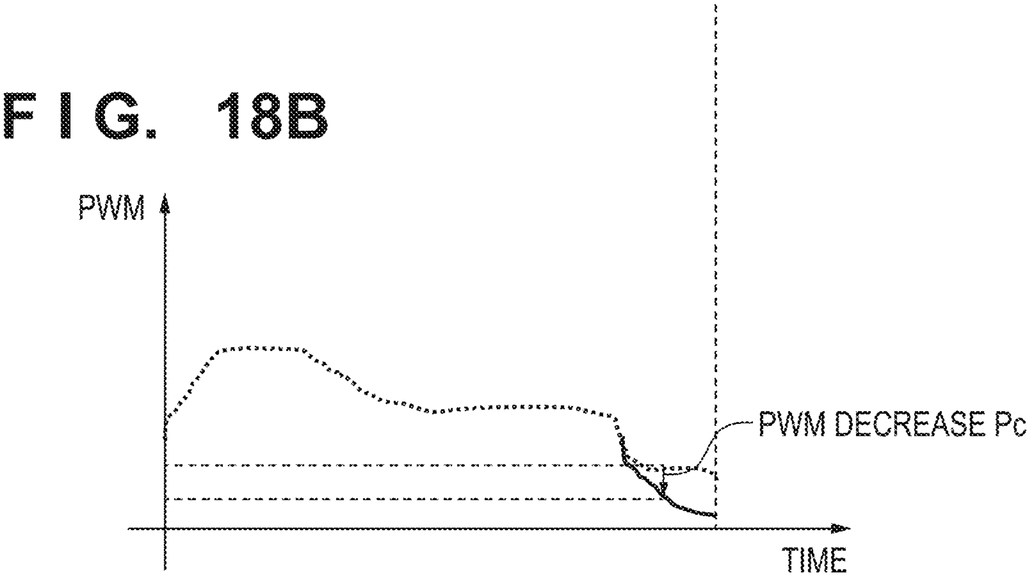

FIGS. 18A and 18B are graphs showing the change in speed and the change of the PWM value, respectively, of the conveyance motor 6 in the case in which the leading end of the succeeding sheet comes off from the separation piece 122 at a timing F during deceleration of the preceding sheet. The ordinates represent the speed and PWM value, respectively, of the conveyance motor 6, and each abscissa represents time. A region A is the acceleration region, a region B is the constant speed region, and a region C is the deceleration region.

A graph P indicates the instructed speed in feeding control of the preceding sheet. As has been described above, in the middle of feeding control, with the normal feeding control (adjustment control OFF) in which the variation of the load of the succeeding sheet influences the feeding control of the preceding sheet, the speed of the conveyance motor 6 abruptly increases in accordance with the PWM value immediately before the load is reduced. Thereafter, the control unit 802 decreases the PWM value by servo control to bring the conveyance motor 6 closer to the instructed speed. However, the speed is not decreased by the timing of reaching the target position, and the speed in the end portion of feeding control is still high.

Under this situation, if the initial PWM value Pi is calculated from the PWM value Pt in the end portion of feeding control based on equation (1), a deviation is generated in the force against the external force (return force). Further, in some cases, the target position may be largely exceeded due to the inertial force of the mechanism system, and the target position may be updated based on this. The cause of reduction of the load during feeding control is not limited to coming-off of the leading end of the sheet from the protrusions 122*a*, but can include the shape of the conveyance path, the shape and structure of the member forming the conveyance path, and the like.

Therefore, in this embodiment, the PWM value is adjusted as follows. That is, in the deceleration region concerning the end region of feeding control, if a speed difference Vd between the target speed and the actual speed is larger than a predetermined value, it is determined that sudden load release has occurred and the PWM value becomes excessive, and a process of decreasing the PWM value by a constant value Pc is performed (adjustment control ON). That is, if the speed difference Vd is larger than the predetermined value, the output value of the conveyance motor 6 is made smaller than in the case of the speed difference Vd equal to or smaller than the predetermined value. With this process, it is possible to appropriately transition to holding control even if the load is released and varies in the deceleration region. A specific example of the process will be described below.

Figure 19:
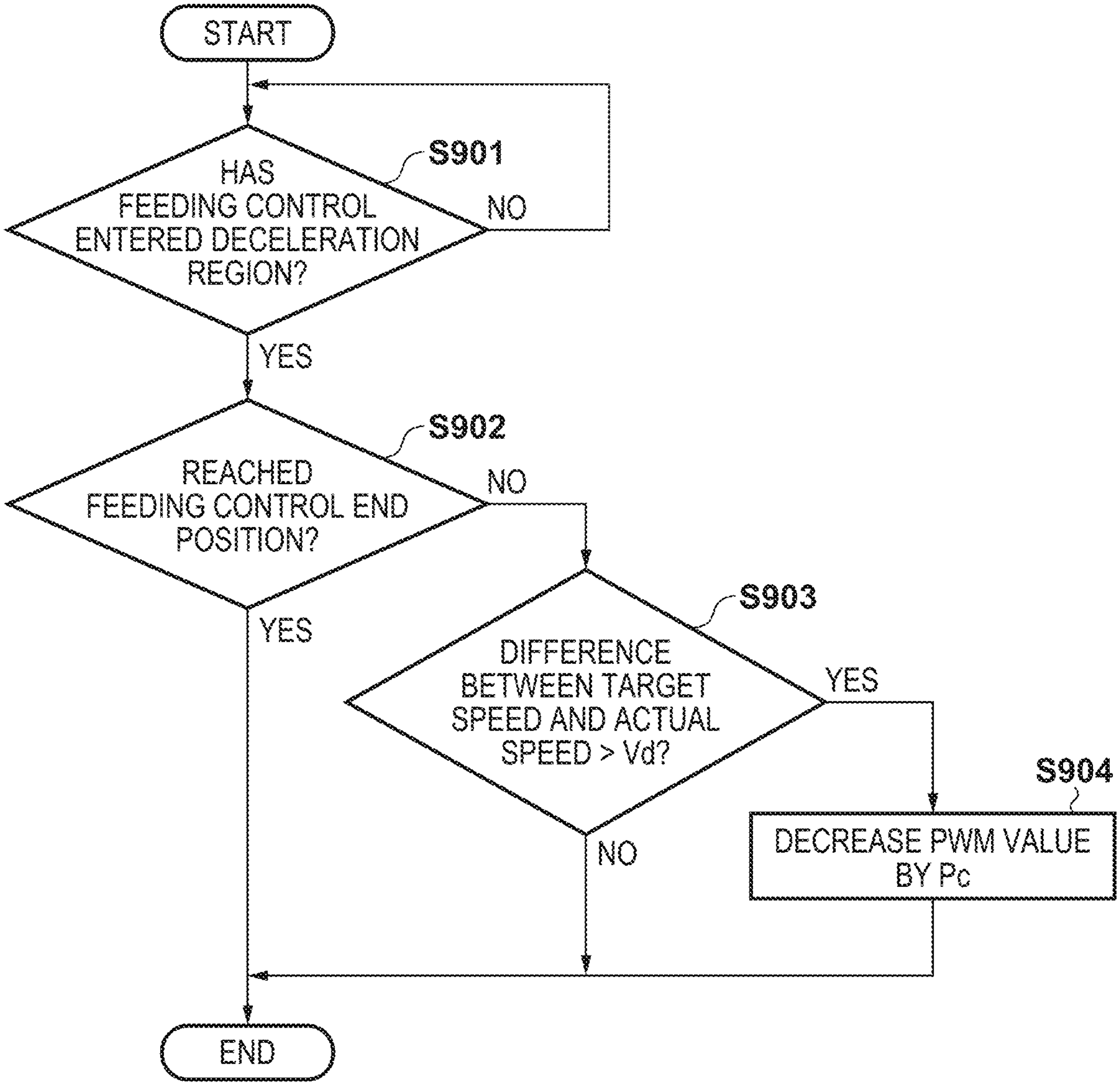
FIG. 19 is a flowchart showing an example of the process of the control unit.

FIG. 19 is a flowchart showing an example of the process of adjustment control for load variation. This flowchart can be executed, for example, concurrently with steps S401 to S403 in FIG. 12.

In step S901, the control unit 802 checks whether the feeding control has entered the deceleration region (region C). If YES in step S901, the control unit 802 advances to step S902; otherwise (if the feeding control is in the acceleration region or the constant speed region), the control unit 802 repeats the check in step S901.

In step S902, the control unit 802 determines whether the rotational position of the conveyance motor 6 has reached the feeding control end position. If YES in step S902, the control unit 802 ends the flowchart; otherwise, the process advances to step S903.

In step S903, the control unit 802 calculates the speed difference Vd between the target speed of the conveyance motor 6 and the actual speed, and checks whether the speed difference Vd is larger than a threshold value Th<sub>Vd</sub>. If the speed difference Vd is larger than the threshold value Th<sub>Vd</sub>, the control unit 802 advances to step S904; otherwise, the control unit 802 ends the flowchart.

In step S904, the control unit 802 decreases the PWM value in the next control cycle by the value Pc.

According to the process described above, if the difference between the target speed of the conveyance motor 6 and the actual speed is large in the deceleration section of feeding control, the control unit 802 decreases the PWM value of the conveyance motor 6. With this process, in a case in which load variation occurs in the deceleration section of feeding control (particularly, in a case in which the load is reduced), it is possible to appropriately perform speed control of the conveyance motor 6 (graph Q2). In addition, when executing the above-described process of deciding the initial PWM value Pi of holding control based on the PWM value Pt in the end portion of feeding control, it is possible to suppress that the initial PWM value Pi becomes larger than necessary.

2. Second Embodiment

A printing apparatus 800 according to the second embodiment will be described below. Note that elements similar to those in the first embodiment are denoted by similar reference numerals, and a description thereof will be omitted.

In the first embodiment, the printing apparatus 1 includes a paper feed port for feeding to the reverse conveyance path (curved conveyance path). The example has been described in which the initial PWM value Pi of holding control is decided based on the PWM value Pt in the end portion of the feeding control region with respect to the load variation caused by the sheet fed particularly in the reverse conveyance path.

On the other hand, the printing apparatus 800 according to the second embodiment includes two paper feed ports, and further includes a mechanism that switches the drive transmitted to the first paper feed port, the second paper feed port, and a recovery mechanism. More specifically, the printing apparatus 800 is provided with the first conveyance path for conveying a sheet set on a front tray to the print position via the first paper feed port and the reverse conveyance path, and the second conveyance path for conveying a sheet set on a rear tray to the print position via the second paper feed port and the conveyance path from the back face side. Here, the first conveyance path corresponds to the conveyance path CP in the first embodiment. The second embodiment is different from the first embodiment in that holding control is executed in consideration of the difference in load variation due to the difference of the conveyance path. In this embodiment, as compared to the first embodiment, a large number of sheets can be stacked. Further, two types of sheets can be stacked. Thus, it is possible to improve the sheet adaptability of the printing apparatus.

<2.1. Control Arrangement>

Figure 20:
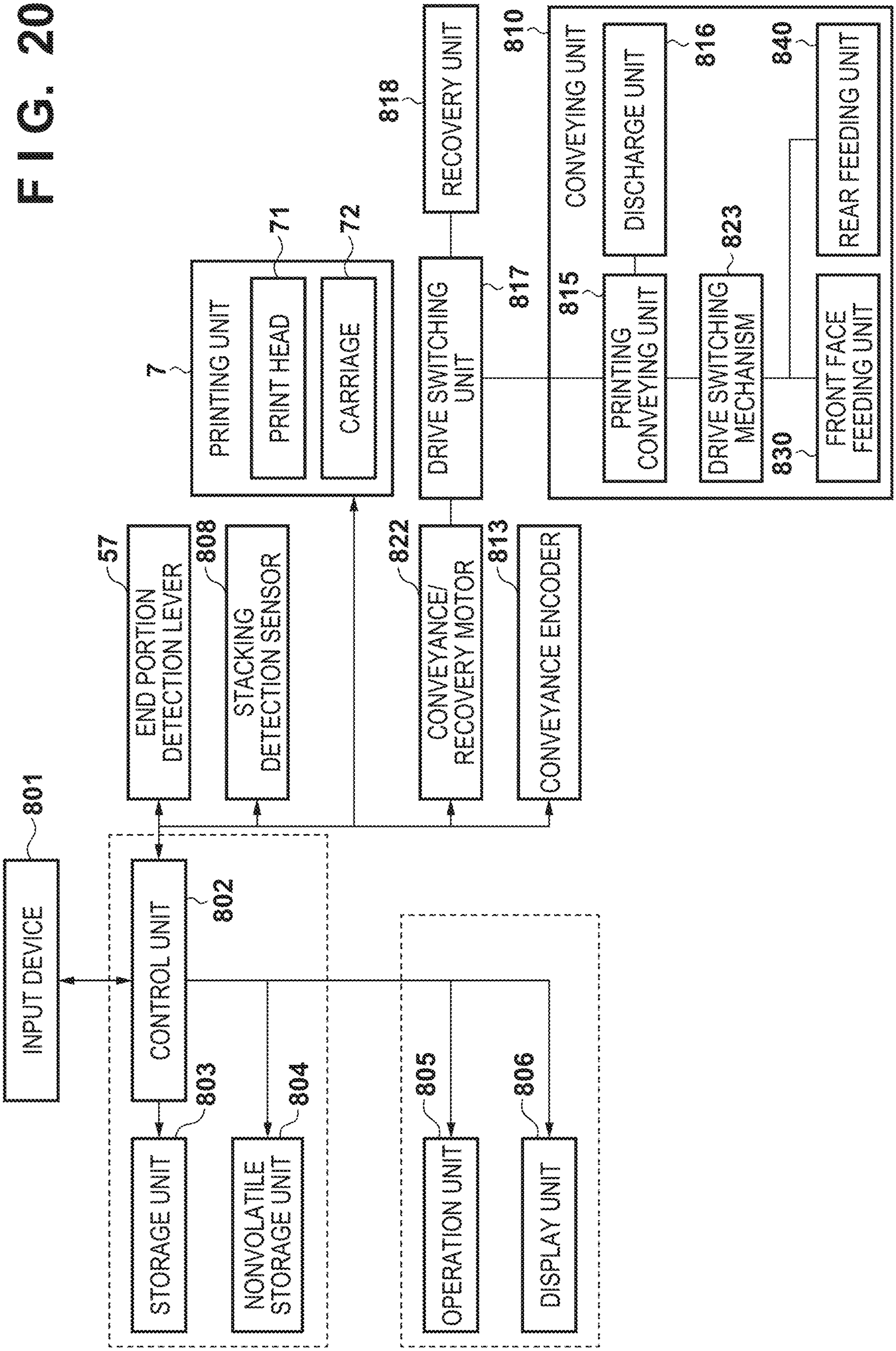
FIG. 20 is a block diagram showing the control arrangement of a printing apparatus.

FIG. 20 is a block diagram showing the control arrangement of the printing apparatus 800. Here, differences from the arrangement of the first embodiment shown in FIG. 8 will be mainly described. In this embodiment, a conveyance/recovery motor 822 is provided in place of the conveyance motor 6. A drive switching unit 817 switches the transmission destination of a drive force, so that one conveyance/recovery motor 822 operates a conveying unit 810 and a recovery unit 818.

The conveying unit 810 conveys a sheet. The conveying unit 810 includes a printing conveying unit 815, a discharge unit 816, a front face feeding unit 830, and a rear feeding unit 840. For example, the printing conveying unit 815 can include a conveyance roller 51, an intermediate roller 3*a*, and the like. The discharge unit 816 can include a discharge roller 53 and the like. The front face feeding unit 830 can include a pickup roller 111 and the like. The rear feeding unit 840 can include a roller for feeding a sheet set on the rear tray to the second conveyance path, and the like. The conveying unit 810 is provided with a drive switching mechanism 823. The drive switching mechanism 823 is configured to be capable of selectively switching between connection and disconnection of power to the front face feeding unit 830 and the rear feeding unit 840. The recovery unit 818 can execute a recovery process of a print head 71. The printing apparatus 800 can execute a printing operation by the flowchart shown in FIG. 10.

<2.2. Example of Process of Conveyance Control>

Figure 21:
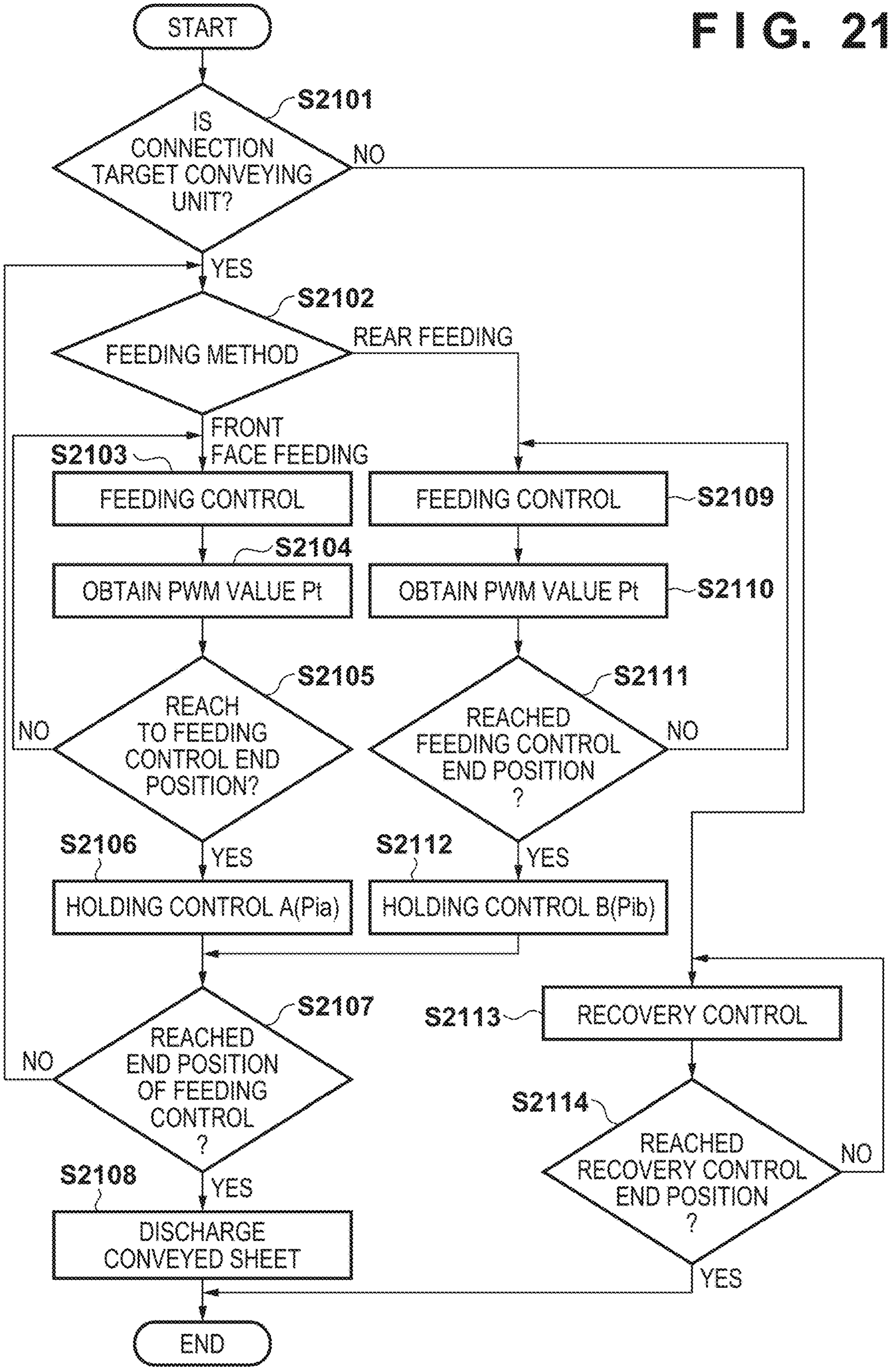
FIG. 21 is a flowchart showing an example of the process of a control unit.

FIG. 21 is a flowchart showing an example of the process of a control unit 802 in conveyance control.

In step S2101, the control unit 802 determines whether the transmission destination of the drive force of the conveyance/recovery motor 822 is the conveying unit 810. If YES in step S2101, the control unit 802 advances to step S2102; otherwise, the control unit 802 advances to step S2113.

In step S2102, the control unit 802 checks the feeding method. If front face feeding is designated, the control unit 802 advances to step S2103. If rear feeding is designated, the control unit 802 advances to step S2109. Steps S2103 to S2106 are similar to steps S401 to S404 in FIG. 12. Steps S2109 to S2112 are also similar to steps S401 to S404 in FIG. 12. However, in this embodiment, the method of calculating the initial PWM value of holding control changes between step S2106 and step S2112. More specifically, in step S2106, a value obtained by subtracting a constant value Pva from a PWM value Pt required in the end portion of feeding control is set as the initial PWM value of holding control. On the other hand, a constant value Pvb is subtracted in step S2112. That is, the initial PWM value of holding control is calculated by either of following equations:

$$Pia=Pt-Pva \quad (7)$$

$$Pib=Pt-Pvb \quad (8)$$

If a conveyance path includes a curved path such as a reverse conveyance path, as compared to a case of not including the curved path, an external force generated in a conveyance member such as a conveyance roller tends to be large. Therefore, the feeding load of a succeeding paper sheet in the front face feeding is larger than in the rear feeding, and the torsion of the drive unit is also larger. Accordingly, the initial PWM value easily becomes large. By setting Pia<Pib, it is possible to appropriately set the initial PWM value in accordance with the external force generated in the conveyance member such as the conveyance roller.

The control unit 802 advances to step S2107 from step S2106 or S2112, and checks whether printing on the entire print region of the sheet is completed. If YES in step S2107, the control unit 802 advances to step S2108; otherwise, the control unit 802 returns to step S2102. Step S2107 corresponds to step S405 in FIG. 12. Processing in Step S2108 is similar to that in step S406 in FIG. 12. After step S2108, the control unit 802 ends the flowchart.

On the other hand, if the process advances from step S2101 to step S2113, the control unit 802 executes recovery control. For example, the control unit 802 executes the suction processing. At this time, the conveyance/recovery motor 822 drives a suction pump included in the recovery unit 818.

In step S2114, the control unit 802 determines whether the recovery control is completed. If YES in step S2114, the control unit 802 ends the flowchart; otherwise, the control unit 802 returns to step S2113.

According to this embodiment, if the transmission destination of the drive force of the conveyance/recovery motor 822 by the drive switching unit 817 is the conveying unit 810, the control unit 802 executes holding control. On the other hand, if the transmission destination is a mechanism (here, the recovery unit 818) different from the conveying unit 810, the control unit 802 does not execute holding control. With this, in the conveying operation which requires higher stop accuracy of the motor, holding control is executed. Thus, a degradation in stop accuracy can be suppressed. On the other hand, in an operation that requires relatively low stop accuracy of the motor, holding control is not executed. Thus, the power consumption of the motor can be reduced. That is, it is possible to achieve both securing the stop accuracy of the motor and reducing the power consumption of the motor.

Further, in this embodiment, the initial PWM value used in holding control changes between the case in which the feeding method is front face feeding and the case in which the feeding method is rear feeding. With this, it is possible to appropriately decide the initial PWM value in accordance with the conveyance load that occurs due to the difference of the conveyance path.

3. Third Embodiment

Figure 22:
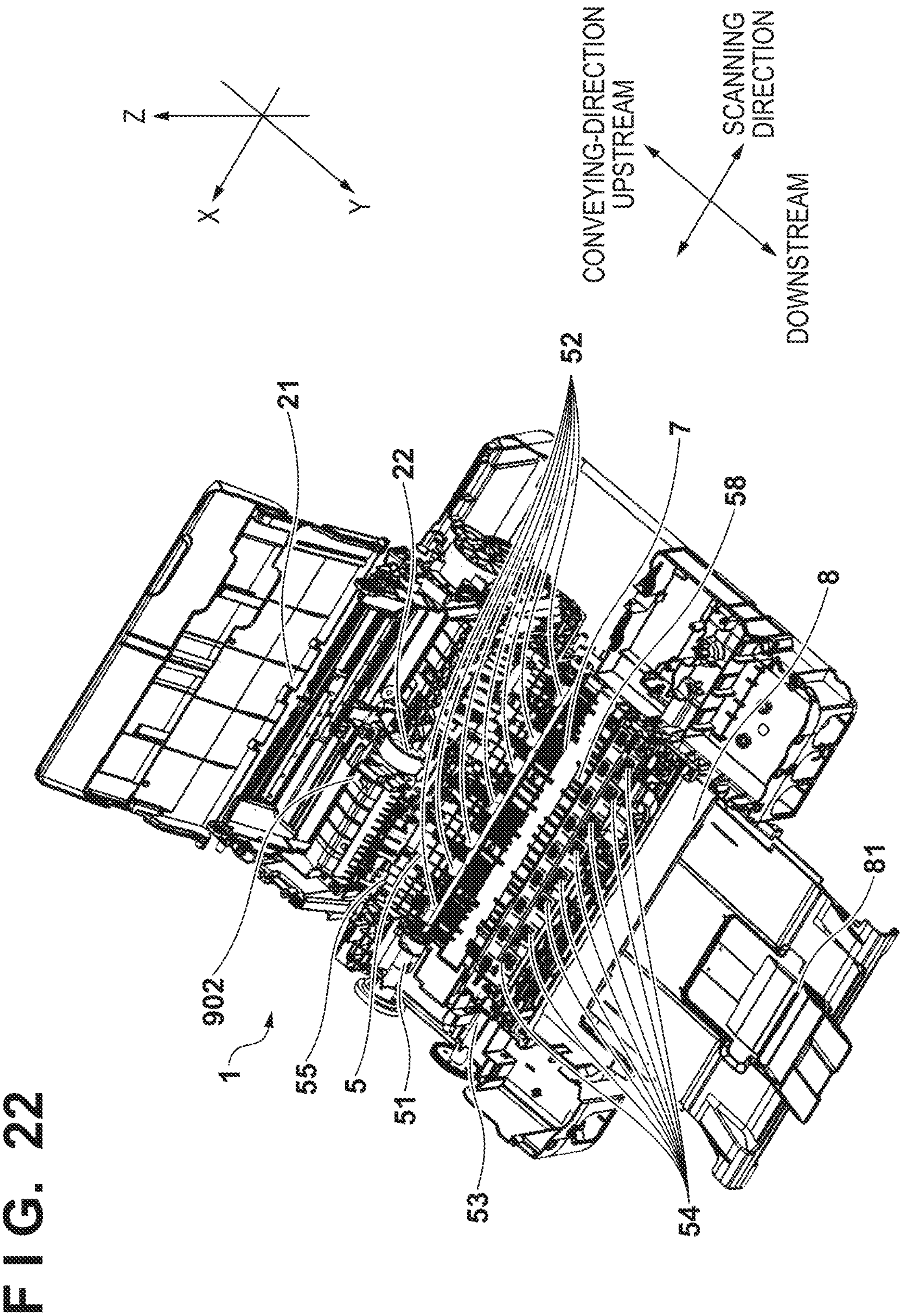
FIG. 22 is a perspective view showing an outline of a printing apparatus according to an embodiment.

FIG. 22 is a perspective view showing an outline of a printing apparatus 900 according to the third embodiment. Hereinafter, elements similar to those in the first embodiment are denoted by similar reference numerals, and a description thereof will be omitted.

The printing apparatus 900 is formed from a feeding unit 902 that separates and feeds sheets one by one, a conveying unit 5 that conveys the sheet fed by the feeding unit 902, a printing unit 7, a conveyance motor 6 (not shown), and a discharge unit 8 that discharges and stacks the sheet printed by the printing unit 7.

<3.1. Arrangement of Feeding Unit>

Figure 23:
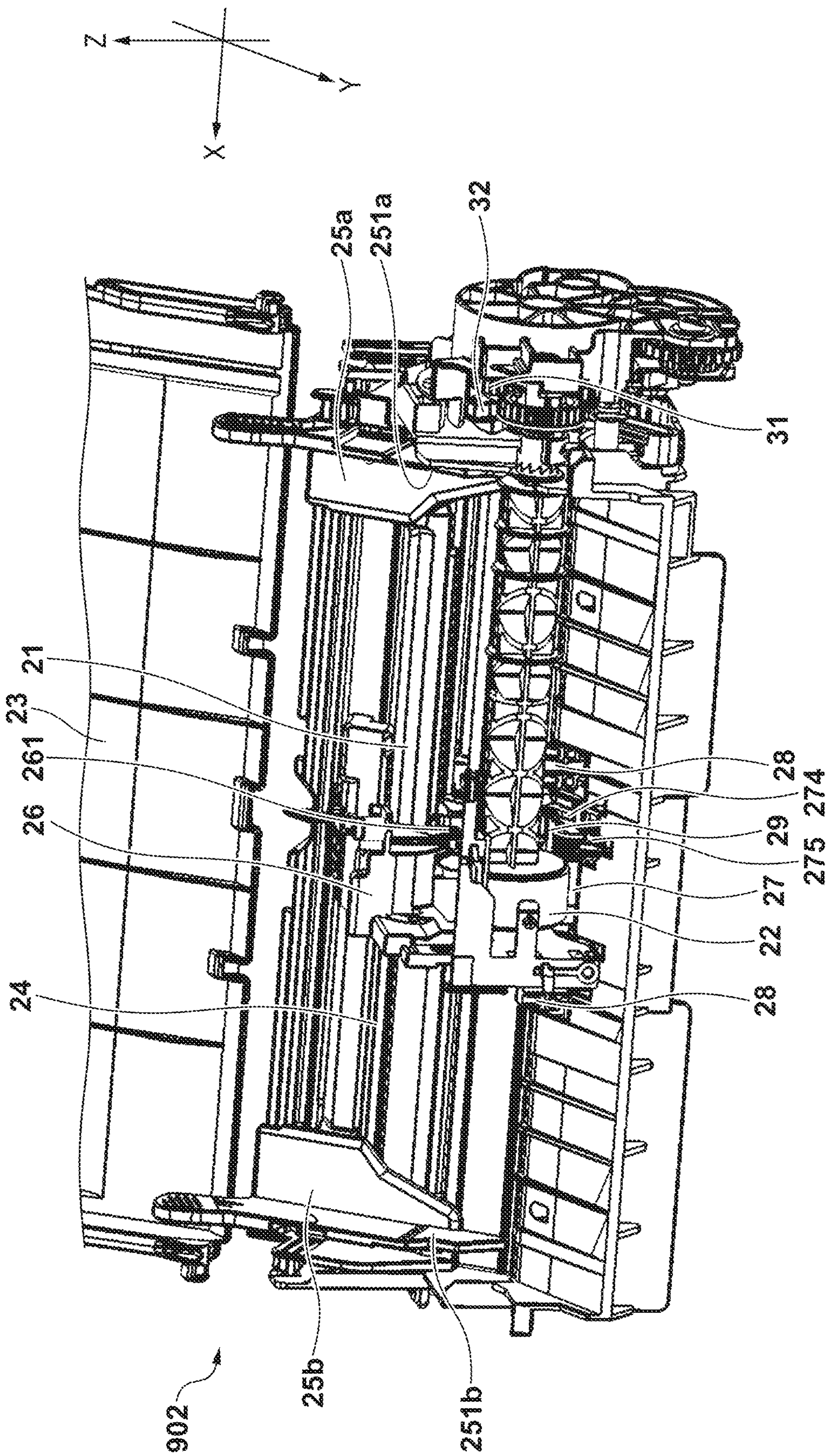
FIG. 23 is a perspective view of a feeding unit.
Figure 24:
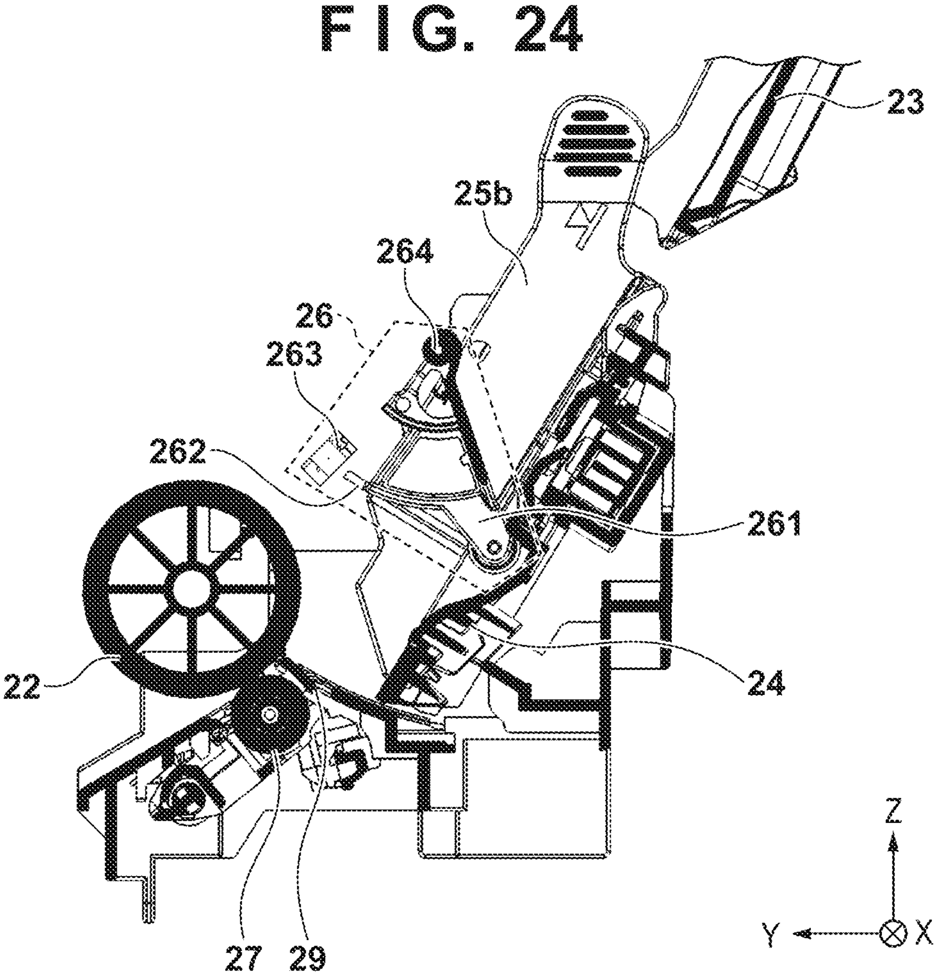
FIG. 24 is a sectional view of the feeding unit in a widthwise direction.

FIG. 23 is a perspective view of the feeding unit 902. FIG. 24 is a sectional view of the feeding unit 902 in the widthwise direction. The feeding unit 902 is formed from a stacking portion 21, a feeding/separating unit, and a drive unit.

The stacking portion 21 is formed from a tray 23, a pressure plate 24, side guides 25*a* and 25*b*, and a stacking detection unit 26. The pressure plate 24 is a press plate that gives a conveyance force to a sheet. The pressure plate 24 is rotationally biased toward a feeding roller 22 by a pressure plate spring (not shown), and is rotationally moved in the direction to separate from the feeding roller 22 by being pressed by a cam provided in the drive unit. A sheet feeding operation is performed by this biasing/separating operation.

While a sheet is not fed by the feeding unit 902, that is, in a so-called standby state, the pressure plate 24 is fixed at a predetermined position in a direction away from the feeding roller 22. At the predetermined position, a sufficient gap for stacking a plurality of sheets is ensured between the feeding roller 22 and the pressure plate 24.

Figure 25:
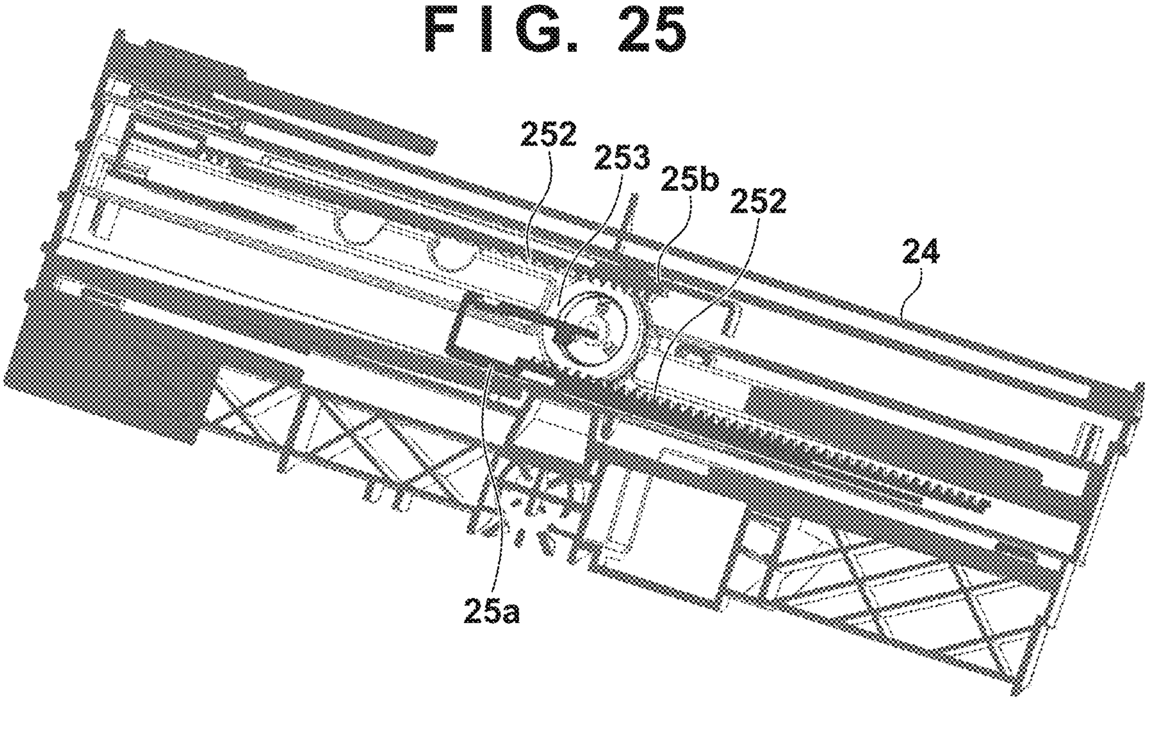
FIG. 25 is a sectional view of a pressure plate in a direction parallel to a sheet stacking surface.

FIG. 25 is sectional view of the pressure plate 24 in a direction parallel to the sheet stacking surface. The side guides 25*a* and 25*b* are slidably attached to the pressure plate 24. Since rack portions 252 respectively provided in the side guides 25*a* and 25*b* are coupled to a side guide gear 253, the side guides 25*a* and 25*b* move interlockingly. The side guide gear 253 is biased by a side guide spring (not shown) in a direction perpendicular to the rotational direction. Thus, the side guide gear 253 is operated only when the side guides 25*a* and 25*b* receive an operation force of a certain level or more, and can be fixed so as not to move unintentionally during the biasing/separating operation of the pressure plate 24, by vibration by a drive source, and when the user carries the printing apparatus.

After the plurality of sheets are stacked in the gap between the feeding roller 22 and the pressure plate 24, the side guides 25*a* and 25*b* are moved to match the width of the sheet so that regulating surfaces 251*a* and 251*b* of the side guides 25*a* and 25*b* regulate the sides of the sheet in the width direction. With this, movement of the stacked sheets in the direction orthogonal to the sheet conveying direction (sheet widthwise direction) is regulated. Thus, the printing apparatus 900 can adapt to an arbitrary sheet width within a predetermined width range, and stably feed sheets of different widths.

The stacking detection unit 26 is formed from a stacking detection lever 261 and an optical sensor 263. The stacking detection lever 261 is rotatably arranged above the pressure plate 24, and is biased toward the pressure plate 24 by a stacking detection spring 264. The stacking detection lever 261 is molded from a member that does not transmit infrared rays. When a flag portion 262 passes between the light emitting portion and light receiving portion of the optical sensor 263, the output of the optical sensor 263 changes, and the position of the stacking detection lever 261 can be detected. In a state in which no sheet is stacked on the stacking portion 21, the flag portion 262 is located outside the light emitting portion and the light receiving portion of the optical sensor 263, so that detection of the sensor is set to OFF. In a state in which sheets are stacked on the stacking portion 21, the distal end of the stacking detection lever 261 abuts against the stacked sheets, and the stacking detection lever pivots. This makes the flag portion 262 to locate between the light emitting portion and the light receiving portion of the optical sensor 263, and detection of the sensor is set to ON. Thus, it is possible to determine whether sheets are stacked on the stacking portion 21.

Next, the arrangement of the feeding/separating unit will be described. With the operation of the pressure plate 24 described above, the stacked sheets are pressed against the feeding roller 22. The feeding roller 22 is rotationally driven at the same time as the sheets are pressed, and the uppermost sheet of the sheets in contact with the feeding roller 22 is conveyed by the friction force of the feeding roller 22. Since the feeding roller 22 feeds a sheet by the friction force, the feeding roller 22 may be made of a material including rubber having a high friction coefficient such as EPDM, or urethane foam.

Here, the friction force between the feeding roller 22 and the uppermost sheet is often larger than the friction force between the uppermost sheet and the sheet immediately below the uppermost sheet. Accordingly, in many cases, the uppermost sheet alone is conveyed. However, for example, when there is the influence of the burr in the sheet end portion, which is generated upon cutting the sheet, when sheets stick together due to static electricity, or when sheets each having a very high friction coefficient on the surface are used, the feeding roller 22 may pull out several sheets at once.

In the case as described above, a separation roller 27 including a torque limiter separates the uppermost sheet alone. The separation roller 27 is pressed against the feeding roller 22 so as to abut against the feeding roller 22 on the conveying-direction downstream side of the point where the feeding roller 22 first comes into contact with the sheet.

Figure 26:
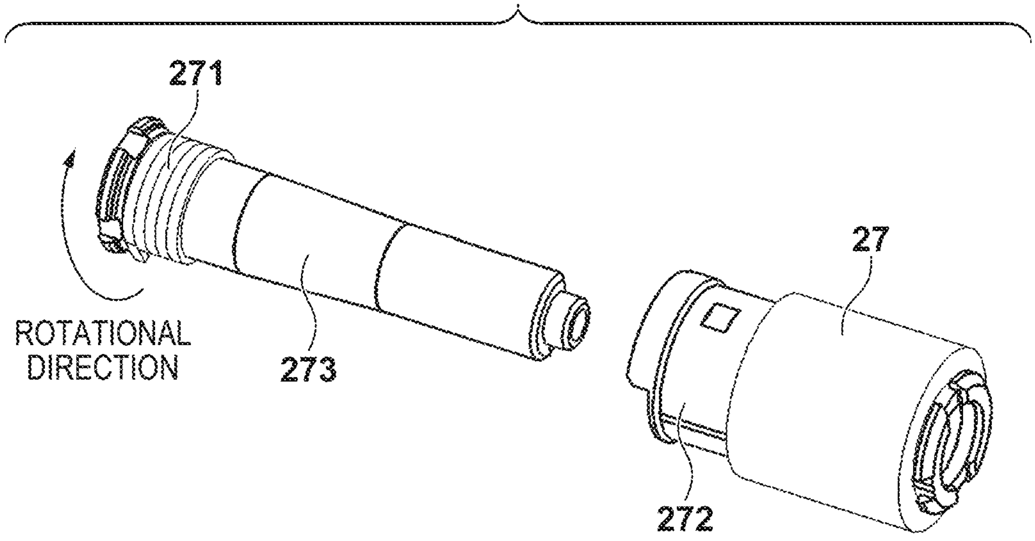
FIG. 26 is an exploded view of a separation roller unit.

The arrangement of the separation roller 27 will be described here. FIG. 26 is an exploded perspective view of a separation roller unit. The separation roller 27 is attached and fixed to a clutch tube 272, and a clutch shaft 273 is rotatably stored in the clutch tube 272. Further, a clutch spring 271 is wounded around the clutch shaft 273, and one winding end of the clutch spring 271 is engaged with the clutch tube 272.

With the arrangement as described above, when the clutch shaft 273 is fixed and the separation roller 27 and the clutch tube 272 are rotated in the arrow direction in FIG. 26, the clutch spring 271 wounded around the clutch shaft 273 is released from the clutch shaft 273. When the separation roller 27 and the clutch tube 272 are rotated by a predetermined angle, the clutch shaft 273 and the clutch spring 271 relatively slip, thereby maintaining a predetermined torque.

The surface of the separation roller 27 is made of rubber or urethane foam so as to have a friction coefficient similar to that of the feeding roller 22. The separation roller 27 is rotatably supported by a separation roller holder 274 serving as a separation means holding member via the clutch tube 272 and the clutch shaft 273. The separation roller 27 is pressed against the feeding roller 22 by a separation roller spring 275.

With the arrangement described above, when there is no sheet between the feeding roller 22 and the separation roller 27, the separation roller 27 is rotated to follow the feeding roller 22 as the feeding roller 22 rotates.

If one sheet enters between the feeding roller 22 and the separation roller 27, since the friction force between the feeding roller 22 and the sheet is larger than the friction force between the sheet and the separation roller 27 following the feeding roller 22 with the predetermined torque, the sheet is conveyed as the separation roller 27 follows. However, if two sheets enter between the feeding roller 22 and the separation roller 27, the friction force between the feeding roller 22 and the sheet on the feeding roller 22 side becomes larger than the friction force between the sheets. In addition, the friction force between the sheet on the separation roller 27 side and the separation roller 27 becomes larger than the friction force between the sheets. Thus, slip occurs between the sheets. As a result, only the sheet on the feeding roller 22 side is conveyed, and the sheet on the separation roller 27 side is stopped and not fed as the separation roller 27 does not rotate.

Next, the arrangement of a multiple feed preventing unit will be described. As has been described above, even if two sheets or so enter the nip between the feeding roller 22 and the separation roller 27, they can be separated. However, there can be a case in which a larger number of sheets more than two sheets enter, or a case in which, after two sheets enter and only the sheet on the feeding roller 22 side is fed, it is tried to successively feed the next sheet while the remaining sheet is left near the nip. In such the case, multiple sheets may be simultaneously fed, that is, so-called multiple feed may occur. To prevent this, a multiple feed preventing unit is provided.

The multiple feed preventing unit includes a return lever 28. The return lever 28 is inserted into the sheet conveyance path when setting sheets or in a print standby state, thereby preventing the leading end of the sheet from unintentionally entering deep into the feeding unit. The return lever 28 is configured to be released at the start of a feeding operation to retreat from the sheet conveyance path. Thus, the return lever 28 does not hinder the travel of the sheet during feeding.

When the separating operation ends, the return lever 28 starts an operation of returning the sheet located in the separation nip by the action of a cam provided in a control gear 31. At this time, a release cam 32 moves a front stage regulation holder 29 serving as a front stage regulation member and the separation roller holder 274 including the separation roller 27 in the direction to separate them from the feeding roller 22. With the separation operation of the front stage regulation holder 29 and the separation roller holder 274, the operation of returning the sheet by the return lever 28 can be performed with a small force.

After the sheet return operation ends, the return lever 28 pivots once to a position to retreat from the sheet conveyance path. After feeding from the feeding unit 902 is completed, the return lever 28 returns to the standby position again.

Figure 27:
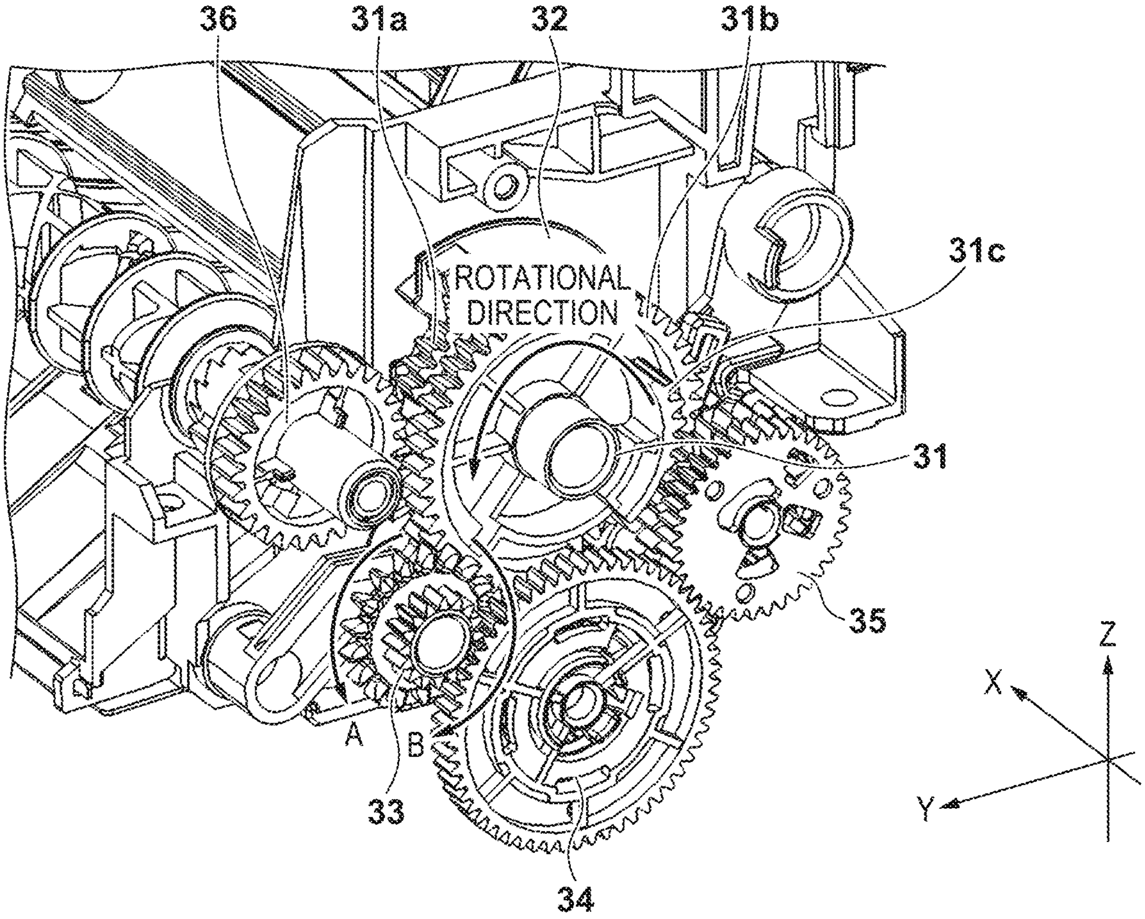
FIG. 27 is a perspective view of a drive unit provided in the feeding unit.

Next, the arrangement of the drive unit will be described. FIG. 27 is a perspective view of the drive unit. The drive unit is formed from an input gear 33, intermediate gears 34 and 35, the control gear 31, the release cam 32, and a roller gear 36. The control gear 31 rotates interlockingly with the release cam 32, and rotates from the standby position, which is the initial position, to the passing paper position by rotating in the rotational direction indicated by an arrow. From the standby position to the passing paper position, the release cam 32 makes a follower (not shown) to pivot by pushing down or releasing the follower. With this, the ascending/descending operation of the pressure plate 24 described above and the retreat/return operation of the return lever 28 are performed. When the control gear 31 transmits the drive to the roller gear 36, the rotation operation of the feeding roller 22 is performed. The control gear 31 rotates from the passing paper position to the standby position by further rotating in the rotational direction indicated by the arrow. From the passing paper position to the standby position, the connection of the drive from the control gear 31 to the roller gear 36 is released by a partially toothed gear 31*a*. In addition, as described above, the return lever 28 is moved from the return position to the standby position. In this manner, when the control gear 31 rotates once in the arrow direction in FIG. 27, a sequential feeding operation of the feeding unit 902 is performed once.

The feeding unit 902 is coupled to the conveyance motor 6 with a gear train (not shown). The feeding unit 902 is driven by rotating the control gear 31 via the intermediate gears 34 and 35 by the drive force input from the input gear 33. Each of the intermediate gears 34 and 35 has a latch mechanism inside two step gears. In rotation in one direction, the two step gears are coupled and operable. However, in rotation in the opposite direction, the two step gears are not coupled, and the step gear on the output side idles with respect to the gear on the input side.

The control gear 31 is formed by partially toothed gears, which include missing tooth parts, of a plurality of steps. When the input gear 33 is driven in the arrow A direction in FIG. 27, the drive is transmitted to a partially toothed gear 31*b* of the control gear 31 via the intermediate gear 34, and the control gear 31 is rotated in the arrow direction in FIG. 27. The partially toothed gear 31*b* of the control gear 31 is provided in the rotation portion from the standby position to the passing paper position described above. Thus, with respect to the drive in the arrow A direction from the input gear 33, the control gear 31 is rotated from the standby position to the passing paper position. After reaching the passing paper position, the connection of the drive between the intermediate gear 34 and the control gear 31 is interrupted since the partially toothed gear 31*b* is decoupled. Accordingly, the control gear 31 does not rotate any further. At this time, the above-described latch mechanism of the intermediate gear 35 prevents transmission of the drive to the step gear, so the drive is not transmitted to a partially toothed gear 31*c* of the control gear 31.

When the input gear 33 is driven in the arrow B direction in FIG. 27, the drive is transmitted to the partially toothed gear 31*c* of the control gear 31 via the intermediate gear 34 and the intermediate gear 35, and the control gear 31 is rotated in the arrow direction in FIG. 27. The partially toothed gear 31*c* of the control gear 31 is provided in the rotation portion from the passing paper position to the standby position described above. Thus, with respect to the drive in the arrow B direction from the input gear 33, the control gear 31 is rotated from the passing paper position to the standby position. After reaching the standby position, the connection of the drive between the intermediate gear 35 and the control gear 31 is interrupted since the partially toothed gear 31*c* is decoupled. Accordingly, the control gear 31 does not rotate any further. The above-described latch mechanism of the intermediate gear 34 prevents transmission of the drive to the step gear, so the drive is not transmitted to the partially toothed gear 31*b* of the control gear 31.

In this manner, when the input gear 33 rotates in the arrow A direction, the drive unit provided in the feeding unit performs the sequential feeding operation from the standby position to the passing paper position. Subsequently, when the input gear 33 rotates in the arrow B direction, the drive unit performs a feed preparation operation from the passing paper position to the standby position. Let L1 be the distance by which the conveyance roller 51 conveys a sheet to the conveying-direction upstream side with driving in the arrow B direction by the rotation amount required for the feed preparation operation.

<3.2. Description of Load Upon Reconnection of Partially Toothed Gear and Application of Initial PWM Value Pi>

In this embodiment, when the input gear is driven in the arrow A direction and the control gear 31 is rotated to the passing paper position, the partially toothed gear 31*c* located at the non-transmission angle (toothless portion) is connected (reengaged) to the drive again halfway through the rotation. This is because, after feeding a sheet, the control gear 31 may be rotated in the arrow B direction during skew correction in the conveyance roller unit, so that it is necessary to disconnect once. The meshing part of the partially toothed gear 31*c* is formed to be elastically deformable in the radial direction such that reconnection is performed smoothly.

The partially toothed gear 31*c* is reconnected during feeding control after feeding a sheet. At this time, if the feeding control is stopped while the tooth tip of the elastic portion of the partially toothed gear 31*c* is in contact with the intermediate gear 35, a reaction force is generated in the drive transmission system, and a force (external force) to return the conveyance motor 6 acts. Since the force to return the conveyance motor 6 changes in accordance with the contact state between the gears when stopped, the PWM value upon transition to holding control may be deviated from the PWM value required to hold the conveyance motor 6. Then, the motor may rotate in the reverse direction due to an insufficient motor torque, or rotate in the forward direction due to an excessive motor torque.

To prevent this, in this embodiment, the PWM value at the start of holding control is adjusted based on the PWM value required to rotate the conveyance motor 6 at the instructed speed in the end portion of feeding control. With this adjustment, it is possible to bring the PWM value of the conveyance motor 6 closer to the appropriate PWM value corresponding to the external force at that time, thereby suppressing the reverse rotation and excessive forward rotation of the motor.

More specifically, control similar to that in the first embodiment can be applied. That is, a value obtained by subtracting a constant value Pd from a PWM value Pt at the end position of feeding control is used as an initial PWM value Pi of holding control. That is, the initial PWM value Pi of holding control may be calculated by:

$$Pi=Pt-Pd \tag{1}$$

for Pd>0

Alternatively, a value obtained by dividing the PWM value Pt by a constant value Pd2 may be used as the PWM value Pi at the start of holding control. That is, $$Pi=Pt/Pd2 \tag{2}$$

for Pd2>1 may hold.

In the region other than the contact region between the partially toothed gear 31*c* and the intermediate gear 35, if the PWM value at the end portion of feeding control is small and the value obtained by subtracting the constant value from the PWM value Pt is smaller than 0, the output value of the conveyance motor 6 in holding control may be regarded as 0 and the same control may be executed.

In the region other than the contact region between the partially toothed gear 31*c* and the intermediate gear 35, the second value Pd2 smaller than the first value may be used as the constant value Pd to be subtracted.

Further, in the region other than the contact region between the partially toothed gear 31*c* and the intermediate gear 35 (that is, in a case in which the external force applied to the conveyance motor 6 is relatively small), application of the initial PWM value Pi based on the PWM value Pt may not be executed.

Further, in a case of conveyance in which an external force is less applied due to the type and speed during conveyance of the conveyed sheet, setting of ON/OFF of the consecutive feeding operation, and the like, the initial PWM value Pi of holding control may be changed to a second value Pi2 (<Pi1). Alternatively, in the case of conveyance in which an external force is less applied, application of the initial PWM value Pi may not be executed.

4. Other Embodiments

Whether to apply the initial PWM value Pi of holding control can be switched as appropriate. For example, in a case of conveyance in which an external force is less applied due to the type and speed during conveyance of the conveyed sheet, the initial PWM value Pi of holding control may not be applied.

For example, information associating the type of sheet and application of the initial PWM value Pi of holding control may be stored in a storage unit 803. If an instruction of conveyance control is received, a control unit 802 may acquire information concerning the type of a sheet 201, and compare it with the above-described information stored in the storage unit 803, thereby deciding whether to apply the initial PWM value Pi based on a PWM value Pt in holding control. A printing apparatus 1 may be configured to be capable of receiving the information concerning the type of the sheet 201 by an input device such as a touch panel or hard keys.

Further, for example, the printing apparatus 1 may set the rotational speed of the conveyance motor 6 during conveyance control in accordance with the size and type of sheet, information input by the user, and the like. Only if the rotational speed is equal to or larger than a threshold value, application of the initial PWM value Pi based on the PWM value Pt may be executed.

In the above embodiments, a serial inkjet printing apparatus is exemplified as the printing apparatus 1, but the features of the above embodiments can be applied, as appropriate, to another conveyance apparatus that sequentially conveys a sheet by a predetermined amount.

Further, in the above embodiments, when the leading end of the sheet S2 is located in the predetermined region A1, the control unit 802 switches the drive control of the conveyance motor 6 so as to reduce the acceleration of the conveyance motor 6 to an acceleration lower than that when the leading end is not located in the predetermined region A1. This suppresses the drive load of the conveyance motor 6 from excessively increasing. On the other hand, suppressing the drive of the conveyance motor 6 more than necessary may cause a deterioration in the efficiency of a printing operation. Accordingly, the control unit 802 may reduce such limitation in accordance with the PWM value during the limitation of the drive of the conveyance motor 6.

For example, when printing on a plurality of sheets, the control unit 802 checks the PWM value at the time of drive control of the conveyance motor 6 in accordance with table 2 in FIG. 28 a plurality of times (for example, one to three times). If the maximum value of the checked PWM value is equal to or less than a threshold value, the control unit 802 may change the acceleration of the conveyance motor 6 to a3 ($a2<a3<a1$) when the sheet S2 is located in the predetermined region A1. This makes it possible to appropriately switch the drive control of the conveyance motor 6 in accordance with a remaining force with respect to the load of the conveyance motor 6. In addition, a plurality of tables with different accelerations may be prepared, and one of the tables may be selected in accordance with a checked PWM value.

Note that when the drive of the conveyance motor 6 is limited in accordance with the rotational speed, the control unit 802 may reduce the limitation by increasing the rotational speed.

The above embodiment uses the length lp of the sheet S1 which is obtained from a set value or the like included in a print job. Another embodiment may use the length lp obtained from a set value or the like included in a print job for a first plurality of sheets and use, as the length lp, the measurement result on the first plurality of sheets for succeeding sheets. The length lp of a sheet can be measured by obtaining the rotation amount of the conveyance motor 6 during the detection of the sheet by the end portion detection lever 57 by using the conveyance encoder 813 and converting the rotation amount of the conveyance motor 6 into the conveyance amount of the conveyance roller 51.

In the above embodiments, the leading end position of the sheet S2 is specified based on the position of the sheet S1. However, the method of specifying the leading end position of the sheet S2 can be changed as appropriate. For example, the predetermined region A1 may be provided with a sensor that detects a sheet, and the presence of the leading end position of the sheet S2 in the predetermined region A1 may be specified based on the detection result obtained by the sensor. For example, the upstream and downstream ends of the predetermined region A1 may be respectively provided with sensors that detect a sheet. The control unit 802 may determine that the leading end of the sheet S2 is located in the predetermined region A1 in the interval between the instant the sensor on the upstream end detects the sheet S2 and the instant the sensor on the downstream end detects the sheet S2. Alternatively, the leading end position of the sheet S2 may be specified based on the detection result obtained by an encoder or the like that detects the rotational angle of the pickup roller 111.

The present invention can be implemented by processing of supplying a program for implementing one or more functions of the above-described embodiments to a system or apparatus via a network or storage medium, and causing one or more processors in the computer of the system or apparatus to read out and execute the program. The present invention can also be implemented by a circuit (for example, an ASIC) for implementing one or more functions.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-170872, filed Oct. 25, 2022, which is hereby incorporated by reference herein in its entirety.

What is claimed is:

1. A printing apparatus comprising:

a printing unit configured to perform printing on a sheet;

a conveying unit configured to convey a sheet to a print position of the printing unit;

a motor configured to drive the conveying unit; and a control unit configured to control rotation of the motor, wherein the control unit is capable of executing holding control of holding the motor at a stop position, and the control unit is configured to determine a first output value, which is an output value of the motor before stopping at the stop position, and determine a second output value, which is an output value of the motor in the holding control, in accordance with the first output value.

2. The printing apparatus according to claim 1, wherein the conveying unit is configured to convey a sheet to a conveying-direction downstream side by rotating the motor in a first rotational direction, and the second output value is an output value which is less than the first output value and makes the motor rotate in the first rotational direction.

3. The printing apparatus according to claim 1, wherein the second output value is a value obtained by subtracting a first predetermined value from the first output value.

4. The printing apparatus according to claim 1, wherein the second output value is a value obtained by dividing the first output value by a predetermined value.

5. The printing apparatus according to claim 1, wherein the control unit is configured to update a target position for stopping the motor to a current position based on a rotational speed of the motor during execution of the holding control.

6. The printing apparatus according to claim 1, wherein the control unit is capable of executing feeding control of controlling rotation of the motor such that the conveying unit conveys a sheet by a predetermined distance, and the first output value is an output value of the motor at an end of the feeding control.

7. The printing apparatus according to claim 6, wherein the control unit executes the holding control in a period from the end of the feeding control to a start of next feeding control.

8. The printing apparatus according to claim 1, wherein the conveying unit includes:

a first roller provided in a conveyance path, and configured to convey a sheet to the print position of the printing unit, and a second roller provided upstream of the first roller in the conveyance path, and configured to convey a sheet, and the motor is configured to drive the first roller and the second roller.

9. The printing apparatus according to claim 8, further comprising:

a switching unit capable of switching between a transmission state in which a drive force is transmitted from the motor to the second roller and a non-transmission state in which a drive force is not transmitted from the motor to the second roller, wherein, when the switching unit is in the transmission state, the control unit determines the second output value in accordance with the first output value.

10. The printing apparatus according to claim 8, wherein the control unit is capable of executing feeding control of controlling rotation of the motor such that the conveying unit conveys a sheet by a predetermined distance, and the control unit is capable of executing a conveying operation of conveying a first sheet by the first roller as the feeding control and concurrently conveying a second sheet succeeding the first sheet by the second roller.

11. The printing apparatus according to claim 10, wherein when a difference between a target rotational speed of the motor and an actual rotational speed becomes greater than a predetermined value in a deceleration section of the motor in the feeding control during execution of the conveying operation, the control unit makes an output value of the motor less than that in a case of the difference not more than the predetermined value.

12. The printing apparatus according to claim 10, further comprising:

a path forming member configured to form a curved section between the second roller and the first roller in the conveyance path.

13. The printing apparatus according to claim 12, wherein the curved section is a section forming a reverse path for reversing a traveling direction of a sheet.

14. The printing apparatus according to claim 12, further comprising:

a stacking portion on which sheets are stacked, wherein the second roller is a pickup roller that conveys the sheet stacked on the stacking portion to the conveyance path, the path forming member includes a separation unit configured to separate an uppermost sheet of the sheets stacked on the stacking portion from remaining sheets, and the separation unit includes an inclined surface member that forms an inclined surface in the conveyance path, and a protrusion that can catch a leading end of the sheet conveyed along the inclined surface.

15. The printing apparatus according to claim 1, further comprising:

a first stacking portion on which sheets are stacked; and a second stacking portion on which sheets are stacked, wherein the control unit is configured to change a method of determining the second output value in accordance with the first output value between a case of conveying the sheet from the first stacking portion to the conveyance path and a case of conveying the sheet from the second stacking portion to the conveyance path.

16. The printing apparatus according to claim 15, wherein at least one of the conveyance path from the first stacking portion to the print position of the printing unit and the conveyance path from the second stacking portion to the print position includes a reverse path for reversing a traveling direction of a sheet.

17. The printing apparatus according to claim 1, wherein the motor is controlled by servo control.

18. A control method of a printing apparatus including a printing unit configured to perform printing on a sheet, a conveying unit configured to convey a sheet to a print position of the printing unit, and a motor configured to drive the conveying unit, the method comprising:

executing holding control of holding the motor at a stop position; and determining a first output value, which is an output value of the motor before stopping at the stop position, and determining a second output value, which is an output value of the motor in the holding control, in accordance with the first output value.

19. A conveyance apparatus comprising:

a conveying unit configured to convey a sheet;

a motor configured to drive the conveying unit; and a control unit configured to control rotation of the motor, wherein the control unit is capable of executing holding control of holding the motor at a stop position, and the control unit is configured to determine a first output value, which is an output value of the motor before stopping at the stop position, and determine a second output value, which is an output value of the motor in the holding control, in accordance with the first output value.

* * * * *